(12) United States Patent
Akutsu et al.

(10) Patent No.: US 6,255,025 B1
(45) Date of Patent: Jul. 3, 2001

(54) FILTER AND PROCESS FOR PRODUCING SAME

(75) Inventors: Eiichi Akutsu; Shigemi Ohtsu; Keishi Shimizu; Lyong sun Pu, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/321,227

(22) Filed: May 27, 1999

(30) Foreign Application Priority Data

Jul. 13, 1998 (JP) .................................................. 10-197564
Nov. 16, 1998 (JP) .................................................. 10-325554
Mar. 26, 1999 (JP) .................................................. 11-084793

(51) Int. Cl.[7] ............................. G02B 5/20; G02F 1/1335
(52) U.S. Cl. ................................................................ 430/7
(58) Field of Search .............................. 430/7; 349/106, 349/110; 359/891

(56) References Cited

U.S. PATENT DOCUMENTS 5,169,672 * 12/1992 Harima et al. ...................... 427/13

FOREIGN PATENT DOCUMENTS 5-150112   6/1993 (JP) .
9-297466  11/1997 (JP) .
11-133224 * 5/1999 (JP) .

\* cited by examiner

Primary Examiner—John A. McPherson
(74) Attorney, Agent, or Firm—Oliff & Berridge, PLC

(57) ABSTRACT

A process for producing a filter comprising: a step of arranging an electrodeposition substrate, which comprises a light transmissible support having a light transmissible conductive film and a photosemiconductor thin film with a photoelectromotive function in this order provided thereon, in such a manner that at least the photosemiconductor thin film is immersed in an electrodeposition solution containing a colored electrodeposition material; a step of imagewise exposing the electrodeposition substrate with applying a voltage or an electric current to the conductive film, to form a colored electrodeposition film in an exposed part; a step of immersing at least the photosemiconductor thin film, in which the colored electrodeposition film has been formed, of the electrodeposition substrate in a metallic plating solution; and a step of applying a voltage or an electric current to the conductive film, to form a black matrix comprising a metallic plating film in a part of the photosemiconductor thin film, in which the colored electrodeposition film is not formed. The black matrix of the metallic plating film may be formed before the formation of the colored electrodeposition film.

20 Claims, 12 Drawing Sheets

FIG.10(A') 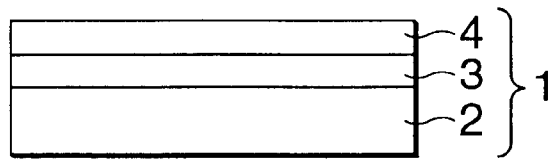
FIG.10(B') 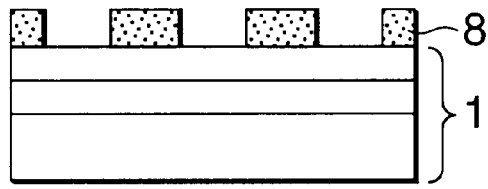
FIG.10(C') 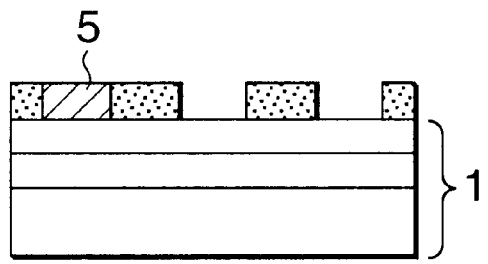
FIG.10(D') 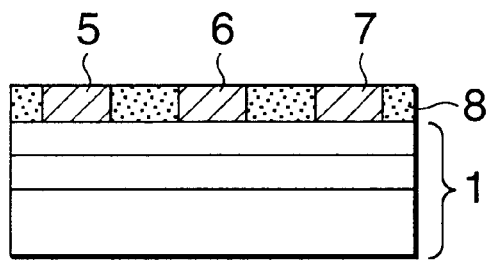
FIG.10(E') 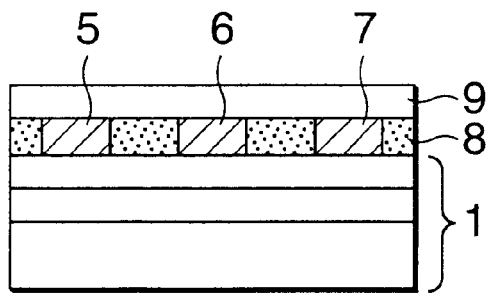

FILTER AND PROCESS FOR PRODUCING SAME

BACKGROUND OF THE INVENTION

1. Field of the Invention

The present invention relates to a filter used in a CCD camera, various display devices such as a liquid crystal display device, and an image sensor, and particularly it relates to a color filter.

2. Description of the Related Art

As a process for producing a color filter, (1) a dyeing method, (2) a pigment dispersion method, (3) a printing method, (4) an ink jet method and (5) an electrodeposition method have been known.

The dyeing method (1) is frequently used in a color charge-coupled device (CCD) since it provides a high transmittance and rich hues, and the technique has been fully established. However, the light resistance is inferior because of the use of a dye, and the number of steps in the production process is large due to the use of photolithography, which results in a high production cost. Therefore, the production for a liquid crystal display device (LCD) is being substituted by the pigment dispersion method.

The pigment dispersion method (2) is the main stream of the process for producing a color filter in recent years. This production process has advantages in that the resulting color filter has a high resolution and a high quality, and the technique has been fully established, but has a disadvantage in that the number of steps in the production process is large due to the use of photolithography, which results in a high production cost.

The printing method (3) does not require photolithography in the formation of R, G and B layers and exhibits a high mass-productivity, but is inferior in resolution and uniformity of the film thickness of the resulting color filter.

The ink jet method (4) does not require photolithography in the formation of R, G and B layers, but is inferior in resolution. Furthermore, it involves a high possibility of mixing the colors of the adjacent filter layers and is inferior in positional accuracy.

In the electrodeposition method (5), an electrodeposition coating is conducted in such a manner in that a high voltage of about 70 V is applied to a light transmissible electrode, which has been previously patterned, in an electrolytic solution comprising a water soluble polymer having a pigment dispersed therein, to form an electrodeposition film, and color filter layers of R, G and B are obtained by repeating these procedures three times. This method has a disadvantage in that it cannot be used for a liquid crystal driven by a TFT because the shape of the pattern is restricted since the light transmissible electrode has been previously patterned by photolithography, which is used as an electrode for electrodeposition.

In general, the color filter for a liquid crystal display cannot be used if it comprises color filter layers only, but it should be a color filter in that gaps among microcells are covered with a black matrix. In order to produce a color filter having a high resolution and a high controllability, the photolithography technique is used for producing the filter cells for each color and the black matrix, which is one of the factors of increasing the production cost.

Therefore, if a product having the equal performance can be obtained without using photolithography, a process for producing a color filter can be realized in that the number of steps is reduced to increase the yield, and the production cost is greatly reduced.

As a process for producing a color filter by using no photolithography, for example, a process for producing a color filter by an electrodeposition method using a photo-memory N-type photosemiconductor has been proposed in JP-A-5-150112.

This process comprises the following steps:

(1) An electrodeposition substrate is produced by forming a layer comprising a photo-memory N-type photosemiconductor, such as zinc oxide dispersed in a resin, on a conductive substrate, such as a stainless plate. The substrate is exposed to an ultraviolet light through a photomask corresponding to one color of the color filter, to generate conductivity only in the exposedpart (i.e., the resistance is decreased), whereas the insulating property of the non-exposed part is maintained.

(2) The conductive substrate, in which the exposed part is maintained to have conductivity due to the use of the photo-memory N-type photosemiconductor, is immersed in an electrodeposition solution for forming an electrodeposition film of that color, and a colored electrodeposition film is formed by electrodeposition by applying a voltage of from 20 to 80 V. At this time, the voltage is applied in such a manner that the N-type photosemiconductor becomes a cathode, the electrodeposition solution contains a cationic electrodeposition material.

(3) The steps of exposure and electrodeposition are repeated for each of the colors necessary for the color filter.

(4) The whole surface of the electrodeposition substrate having thereon a colored electrodeposition film is exposed to an ultraviolet ray, to generate conductivity on a part of the photo-memory photosemiconductor that is not covered with the colored electrodeposition film, and then a black matrix is formed by conducting metallic plating or electrodeposition of a black electrodeposition film by using an electrodeposition solution containing a mixed black pigment.

(5) The multi-color filter layer thus formed is transferred to a transparent substrate.

In this process, in order to improve the releasability between the multi-color filter layer and the photo-memory N-type photosemiconductor during transfer, a releasing layer has been provided between the two layers, or another step is required in that metallic plating is conducted on the whole surface of the photosemiconductor before providing the color filter layer, and after the transfer, the metallic plating layer remaining as attached on the multi-color filter layer is removed by dissolving.

This process realizes reduction in production cost in comparison with the related process using the photolithography method in the standpoint not using the photolithography method. However, it still requires a large number of steps in that the transfer step is required, exposure and electrodeposition are conducted in separate steps, and a step of providing the releasing layer is required.

Accordingly, a process for producing a color filter having a high performance in a low cost, in which the photolithography method is not used, and the number of steps is small, has been demanded.

SUMMARY OF THE INVENTION

An object of the invention is to provide a process for producing a color filter, in which the photolithography method is not used, the number of manufacturing steps is small, and the production cost is low.

Another object of the invention is to provide a color filter having excellent characteristics, in which a clear boundary is present between an edge part of a filter part and an edge part of a black matrix, which suffers no leakage or light, and the resolution and the controllability are high, by the process for producing a color filter.

The above and other objects of the invention are attained by the processes (1) and (2) for producing a color filter (1) and (2) described below.

(1) A process for producing a filter comprising:
a step of arranging an electrodeposition substrate, which comprises a light transmissible support having a light transmissible conductive film and a photosemiconductor thin film with a photoelectromotive function in this order provided thereon, in such a manner that at least the photosemiconductor thin film is immersed in an electrodeposition solution containing a colored electrodeposition material;
a step of imagewise exposing the electrodeposition substrate with applying a voltage or an electric current to the conductive film, to form a colored electrodeposition film in an exposed part;
a step of immersing at least the photosemiconductor thin film, on which the colored electrodeposition film has been formed, of the electrodeposition substrate in a metallic plating solution; and
a step of applying a voltage or an electric current to the conductive film, to forma black matrix comprising a metallic plating film in a part of the photosemiconductor thin film, on which the colored electrodeposition film is not formed.

(2) A process for producing a filter comprising:
a step of arranging an electrodeposition substrate, which comprises a light transmissible support having a light transmissible conductive film and a photosemiconductor thin film in this order provided thereon, in such a manner that at least the photosemiconductor thin film is immersed in a metallic plating solution;
a step of imagewise exposing the electrodeposition substrate with applying a voltage or an electric current to the conductive film, to form a black matrix comprising a metallic plating film in a non-exposed part;
a step of immersing at least the photosemiconductor thin film, on which the black matrix has been formed, of the electrodeposition substrate in an electrodeposition solution containing a colored electrodeposition material; and
a step of imagewise exposing the electrodeposition substrate with applying a voltage or an electric current to the conductive film, to form a colored electrodeposition film in an exposed part.

BRIEF DESCRIPTION OF THE DRAWINGS

FIGS. 10A' to 10E' are schematic cross sectional views showing another embodiment of the process for producing a color filter according to the invention.

DETAILED DESCRIPTION OF THE INVENTION

Figure 1:
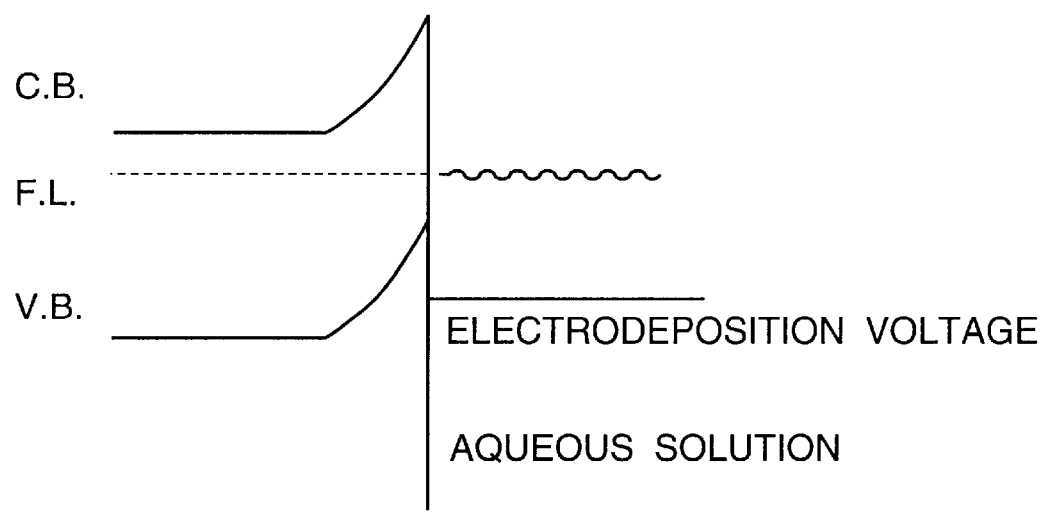
FIG. 1 is a schematic diagram showing a Schottky junction formed between a surface of a photosemiconductor and an electrodeposition solution.

In order to attain the objects described above, the inventors have investigated the electrodeposition technique and the photoelectric effect from their principles and have reached to note that some substances, the solubility of which in water is largely changed by the change among an oxidation condition, a neutral condition and a reduction condition, have found among water soluble polymers. The transition of the polymer among these conditions can be conducted by either undergoing direct oxidation-reduction of the polymer electrochemically, or by changing the pH of the aqueous solution having the polymer dissolved therein.

In general, a polymer material having a carboxyl group as a hydrophilic group largely changes its solubility depending on the hydrogen ion concentration (pH) of the solution even without change in structure. For example, part of anionic aqueous dispersion materials is soluble in water at pH 8 or higher but precipitates at pH 5 or lower, and part of water soluble acrylic resins having a carboxyl group is soluble in water by ionic dissociation at pH 7 or higher but the resin component precipitates at that pH value or lower because ionic dissociation is impossible.

When a polymer material having such properties is dissolved in a weakly alkaline water, and electrodes are immersed therein, to which a voltage is then applied, an electrodeposition film comprising the polymer material is formed on the electrode of an anode side. When an electrode is immersed in an aqueous dispersion, in which a pigment is dispersed with such a polymer material, and a voltage is applied to the electrode, the pigment and the polymer material are deposited on the electrode of an anode side to form an electrodeposition film comprising the pigment and the polymer mixed with each other. It has been found that the electrodeposition film suffers ionic dissociation of the polymer either by applying a voltage contrary to the voltage on forming the electrodeposition film in the electrodeposition solution, or by immersing in an aqueous solution having a pH of from 10 to 12, and thus the electrodeposition film is re-dissolved to decrease the film thickness.

In order to form the electrodeposition film, a voltage of a certain value or higher (threshold voltage) for forming the electrodeposition phenomenon is required, and an electrodeposition film is not always formed by flowing an electric current in any case.

The phenomenon will be described with reference to a water soluble acrylic resin containing a carboxyl group having an ability of forming an electrodeposition film as an example. The resin is easily dissolved in weakly alkaline water (pH of from 8 to 9) to be present as an anion in the aqueous solution, but has characteristics in that it becomes insoluble to be deposited when the pH becomes 7 or lower. When an electricity is applied to a platinum electrode immersed in the aqueous solution of the resin, an $OH^-$ ion in the aqueous solution in the vicinity of an anode is consumed and becomes $O_2$, and as a result, the amount of a hydrogen ion increases to lower the pH. This is because the reaction of combining a hole (p) and an $OH^-$ ion shown by the following scheme occurs in the vicinity of the anode.

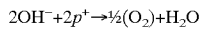

$$2OH^- + 2p^+ \rightarrow \frac{1}{2}(O_2) + H_2O$$

Ionic dissociation of water by applying a certain voltage is required to cause the reaction. Therefore, when a voltage of a certain value or higher is applied, the reaction occurs, and the hydrogen ion concentration in the aqueous solution increases with the progress of the reaction to lower the pH. Accordingly, the solubility of the water soluble acrylic resin on the anode side decreases, and thus the resin is insolubilized to form a thin film on the anode.

By utilizing the mechanism described above, an electrodeposition film can be formed with a relatively low voltage, i.e., 3 V or lower.

The invention is obtained by applying the knowledge described above to a photoelectrodeposition process.

The photoelectrodeposition process has been established by the inventors (Japanese Patent Application No. 9-297466), in which in order to obtain a voltage larger than the threshold voltage, a photosemiconductor having a photoelectromotive function is irradiated with light to forman electromotive force (photoelectromotive force) in the irradiated part, and an electrodeposition film is formed only on the irradiated part by utilizing the electromotive force.

Figure 2:
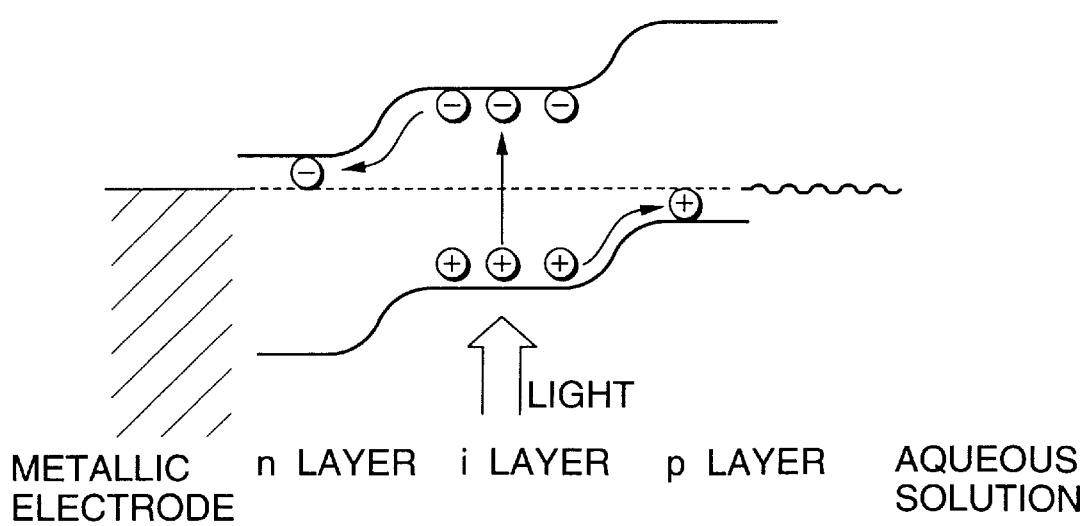
FIG. 2 is a schematic diagram showing a phenomenon in that when an i layer of a pin junction is irradiated with light, a carrier is formed in the i layer and migrates.

The formation of the photoelectromotive force in the invention is attained by a Schottky barrier formed at an interface between a surface of a photosemiconductor thin film and an electrodeposition film, or a pn junction and a pin junction well known as a solar cell. FIG. 1 is a schematic diagram showing a Schottky barrier formed between a surface of a photosemiconductor and an electrodeposition solution, in which C.B. indicates a conduction band, F.L. indicates a Fermi level, and V.B. indicates a valence electron band. FIG. 2 is a schematic diagram showing the formation and migration of a carrier when an i layer of a photosemiconductor having a pin junction intervening between a metallic electrode and an electrodeposition solution is irradiated with light.

The photoelectromotive force obtained by the irradiation of a photosemiconductor thin film with light is 0.6 V at most in crystalline silicon having a high efficiency, which is not sufficient to bring about the electrodeposition phenomenon even though the reaction in the vicinity of the electrodes described above. In the invention, therefore, a bias voltage is applied to supplement the shortage in voltage.

In the case where a photosemiconductor having a photoelectromotive force of about 0.6 V is used for example, when an electrodeposition material deposited at a voltage of 2.0 V is used, abias voltage of 1.5 V is applied with irradiation with light, and the total voltage becomes 2.1 V, which is the sum of the bias voltage of 1.5 V and the photoelectromotive force of 0.6 V, exceeding the threshold voltage required to occur the electrodeposition. As a result, a photoelectrodeposition film is formed only on the part irradiated with light.

When the total voltage is too high (for example, 10 V or more), the Schottky barrier is not maintained, and it is impossible to selectively form the electrodeposition film only on the irradiated part. That is, an electric current flows in the part not irradiated with light due to breakage of the Schottky barrier, and the electrodeposition film is formed on the whole area of the photosemiconductor thin film.

In the invention, by using the difference in solubility of the colored electrodeposition material depending on pH, a bias voltage (for example, 5 V or less) as low as not breaking the Schottky barrier can be used.

The electrodeposition substrate used in the invention will be described. The electrodeposition substrate of the invention comprises a light transmissible support having thereon a light transmissible conductive film and a photosemiconductor thin film having a photoelectromotive function in this order. The light transmissible support transmits the visible rays, and examples thereof include a glass plate, and a plate, a sheet or a film comprising, for example, polyethylene terephthalate, polyethylene naphthalate, polyether sulfone, polyether imide, polyether ketone, polyphenylene sulfide, polyallylate, polyimide or polycarbonate.

Examples of the light transmissible conductive film formed on the light transmissible support include an ITO film, tin dioxide and indium oxide.

The photosemiconductor thin film having a photoelectromotive function (hereinafter simply referred to as a photosemiconductor thin film) formed adjacent to the light transmissible conductive film will be described.

In the invention, the photosemiconductor thin film having a photoelectromotive function is selectively exposed (imagewise exposure) to generate a photoelectromotive force only on the exposed part, and at the same time, a voltage or an electric current is applied between the conductive film and a counter electrode in an electrodeposition solution, so as to form a colored electrodeposition film only on the exposed part.

As the photosemiconductor used in the invention, a photosemiconductor thin film that generates an electromotive force by irradiation with light and has no large light hysteresis effect (non-light memory property) can be basically used without particular limitation. Because a photosemiconductor having a strong hysteresis effect (light memory property) is not used in the invention, an photoelectromotive force is formed only on the period of irradiating with light to exhibit the electrodeposition phenomenon, and thus a sharp image with a high resolution can be obtained. Examples of such a photosemiconductor include a compound semiconductor, an organic semiconductor, amorphous silicon and polysilicone.

Specific materials for the photosemiconductor will be exemplified. As the compound semiconductor material, titanium oxide, silicon carbide, lead oxide, zinc oxide, nickel oxide, tin oxide and molybdenum oxide are preferably used, and other examples thereof include GaN, a-C, BN, ZnSe, a GaAs series compound, CuS and $Zn_3P_2$. Examples of the organic semiconductor material include a phthalocyanine pigment series material, a perylene pigment series material, an azo pigment series material and polyvinyl carbazol. These semiconductor materials may be used as a single layer, a multi-layer or a mixture. In the invention, the photosemiconductor thin film having no large light hysteresis effect is formed by using these materials with consideration of the crystallinity, the film thickness, the volume resistivity and the light absorption property. Furthermore, mixing of an insulating material such as a resin into the photosemiconductor layer decreases the generated the electric current and brings about a large light hysteresis effect, and these phenomena should also be considered.

As the photosemiconductor, one having a high transmissibility to the visible rays is preferred.

From the standpoint of the polarity of the photosemiconductor used in the invention, an n-type photosemiconductor, a photosemiconductor having a pn junction and a photosemiconductor having a pin junction are used in the invention. In the case where a photosemiconductor having a laminated structure is used, a photoelectric current flows well to surely obtain an electromotive force, and thus the contrast of the image is improved to obtain a color filter having a high resolution.

The photosemiconductor thin film used in the invention preferably has a volume resistivity of $10^5$ Ω·cm or less. This is because the volume resistivity largely influences as a factor of controlling the quantity of the electric current passing within the film, and when it is $10^5$ Ω·cm or less, a large quantity of the electric current is obtained to improve the efficiency of the photoelectric motive force.

In the invention, the black matrix is formed with a metallic plating film. In order to obtain a metallic plating film having a higher light shielding property, it is necessary that the metallic plating film is a film having a high crystallinity. Because the crystallinity of the metallic plating film is influenced by the crystallinity of the subbing layer, the photosemiconductor thin film preferably has a high crystallinity, such as a single crystal, microcrystals or polycrystals.

As described later in detail, in the case where, for example, an n-type photosemiconductor thin film is used as the photosemiconductor thin film, and an electrodeposition solution containing an electrodeposition molecule having an anionic group is used, to form a color filter film, followed by forming a black matrix comprising a metallic plating film on a part of the photosemiconductor film, on which the color filter film is not formed, by using a metallic plating solution, a voltage is applied to the conductive film in such a manner that the photosemiconductor thin film is positive with respect to the counter electrode on forming the color filter layer, and another voltage is applied to the conductive film in such a manner that the photosemiconductor thin film is negative on forming the metallic plating film, i.e., the photosemiconductor thin film is used as both an anode and a cathode. Therefore, the photosemiconductor is necessary to maintain its stability in the electrodeposition solution in both the cases where it is used as an anode and a cathode.

Among the photosemiconductors, a compound semiconductor is physically stable in an aqueous liquid to maintain its surface not damaged, and has an excellent light transmissibility. Among the compound semiconductors, $TiO_2$ is particularly preferably used in the invention because it has a polycrystalline structure of a high crystallinity and is excellent in photoelectromotive function, transmissibility to the visible rays, and formability into a thin film.

Some methods for forming $TiO_2$ into a thin film have been known. For example, a heat oxide film formation method, a sputtering method, an electron beam method (an EB method) and a sol-gel method have been well known. A $TiO_2$ film obtained by an ordinary EB method or an ordinary sol-gel method has a low photoelectric conversion efficiency, and a photoelectromotive force sufficient f or electrodeposition may not be obtained. In order to increase the conversion efficiency of a photoelectric current, a reducing treatment is preferably conducted. The reducing treatment is conducted by heating in a hydrogen gas. A treatment at a low temperature with a short period of time, for example at about 360° C. for 10 minutes under a stream of a nitrogen gas containing 3% of hydrogen at 1 L/min, can provide a sufficient effect.

The thickness of the photosemiconductor thin film provided in the electrodeposition substrate is preferably from 0.05 to 3 μm, within which good characteristics can be obtained. When it is less than 0.05 μm, a photoelectromotive force obtained is too small to form an electrodeposition film. When it exceeds 3 μm, an electric charge formed by light is trapped in the photosemiconductor layer to excessively increase the light hysteresis phenomenon, and a sharp image is difficult to be obtained. Since a protective layer may be formed on the surface of the multi-color filter thus produced as described later, the thickness of the photosemiconductor thin film is preferably within the range described above with the consideration of the thickness of the protective layer.

In order that the generation efficiency of the photoelectromotive force is increased, and the formation of an electrodeposition film is made easy, it is preferred that the photosemiconductor thin film is formed only with a photosemiconductor but the use of an insulating material such as a resin mixed therewith is avoided.

The electrodeposition solution for forming a color filter used in the invention will be described. The color filter electrodeposition solution contains a colored electrodeposition material that contains a substance forming a thin film (an electrodeposition film) by changing its solubility or dispersibility in the electrodeposition solution depending on the change of the pH of the electrodeposition solution. Such a substance is generally an ionic molecule containing an ionic group in its molecule. Examples of the colored electrodeposition material containing the ionic molecule include an ionic dye, a mixture of the ionic dye and a pigment, and a mixture of the ionic dye and/or the pigment with an ionic polymer as the ionic molecule. In the invention, an ionic molecule having such a property in that the solubility or dispersibility thereof suddenly decreases with the decrease in pH of the electrodeposition solution is preferably used.

Figure 3:
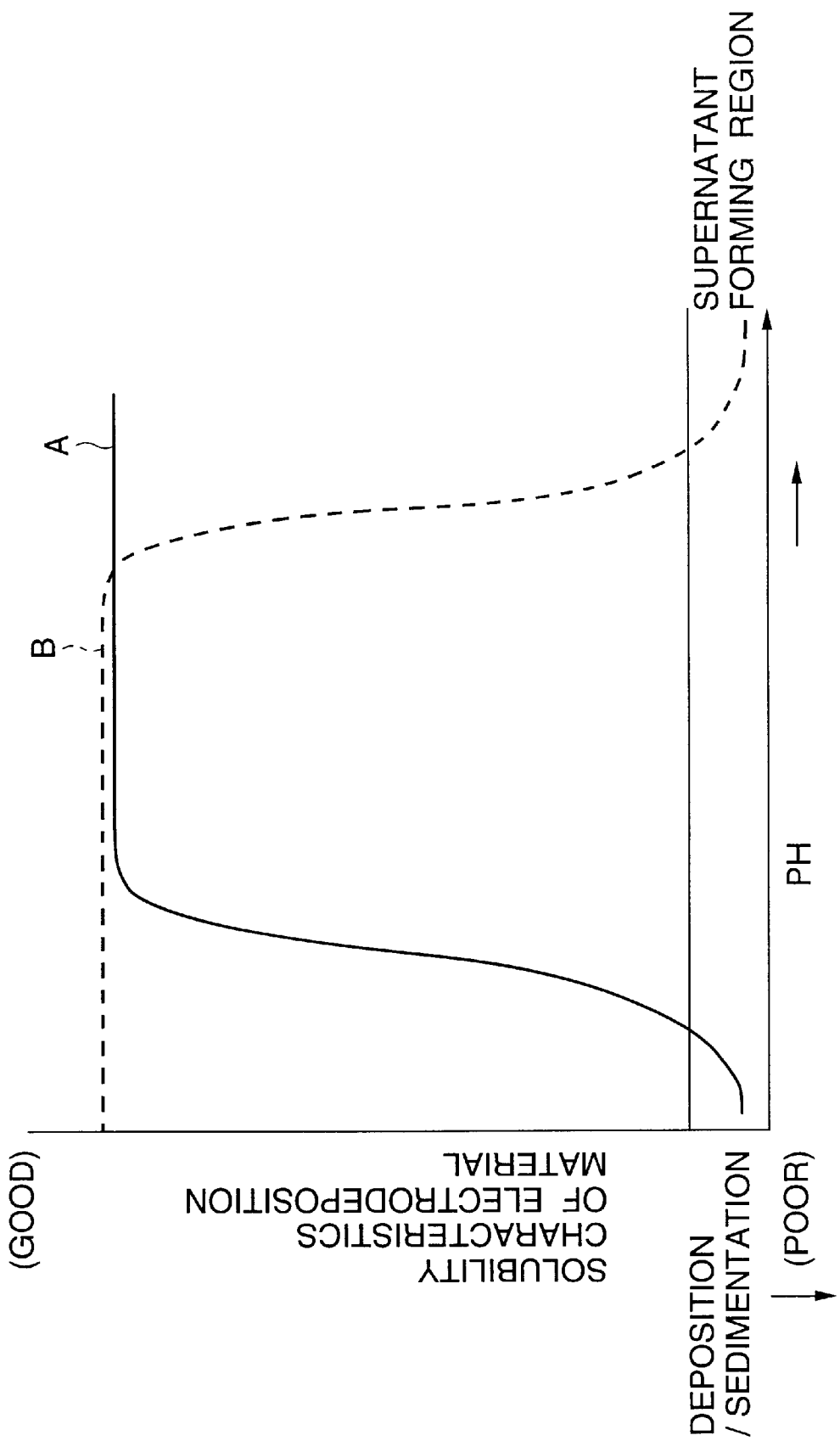
FIG. 3 is a graph showing change in solubility characteristics of an electrodeposition material of the invention depending on the change of pH.

The mechanisms of the colored electrodeposition material used in the invention aggregated depending on the change of pH will be described. FIG. 3 is a graph showing the relationship between the change of pH and the phenomenon in that an anionic electrodeposition material and a cationic electrodeposition material used in the invention are aggregated with forming a supernatant. The curve A shows that the anionic electrodeposition material loses the solubility with the decrease in pH to be aggregated (deposition and sedimentation), and the curve B shows that the cationic electrodeposition material loses the solubility with the increase in pH to be aggregated.

As the colored electrodeposition material containing the ionic molecule, a mixture of the ionic dye and/or the pigment and the ionic polymer as the ionic molecule is preferably used because fine particles of an arbitrary coloring material (such as a pigment and a dye) can be dispersed in a polymer having an electrodeposition property having transmissibility in the visible ray region. The pigment is more preferably used since it has a higher light resistance and weather resistance than the dye. Even though the pigment itself does not have a function of forming an electrodeposition film, it is combined with the ionic polymer having an electrodeposition property, and thus an electrodeposition film comprising the polymer and the pigment is formed by incorporating the pigment into the ionic polymer on aggregation thereof.

As the pigment, known red, green or blue pigments may be used without particular limitation, and the smaller the particle diameter of the pigment is, the better the reproducibility of the hue. A pigment having an average particle diameter of 200 nm or less is particularly preferred.

The ionic polymer forming a thin film (electrodeposition film) by decreasing the solubility or dispersibility in the electrodeposition solution with the change of pH of the electrodeposition solution (hereinafter such an ionic polymer having an electrodeposition property is called as an "electrodeposition polymer") will be described below.

The electrodeposition polymer must have a sufficient solubility or dispersibility in an aqueous liquid (including an aqueous liquid, the pH of which has been adjusted) and a light transmissibility. The electrodeposition polymer preferably causes the change from the dissolved or dispersed state to the state where a precipitate is formed with forming a supernatant within a pH range of 2 or less. When the pH range is 2 or less, an immediate deposition of an image is possible on a sudden change in pH by application of electricity, and superior effects can be obtained in that the aggregation force of the resulting image is high, and the re-dissolving rate into the electrodeposition solution is lowered. Accordingly, a filter layer having a high light transmissibility and a high water resistance is obtained.

In the case where the pH range is more than 2, lowering in printing rate for obtaining a sufficient image structure and lack in water resistance of the image are liable to occur. In order to obtain better characteristics, the pH range is more preferably 1 or less.

As the electrodeposition polymer, a polymer having a hydrophilic group and a hydrophobic group that accelerates insolubilization in water in the molecule. Because the hydrophobic group has a large affinity to an organic pigment used as the coloring material and thus has a function of adsorbing the organic pigment, it endows an appropriate function of dispersing the pigment to the polymer. Furthermore, the hydrophobic group also endows the function of immediately depositing an image to the polymer by cooperation with a hydrophobic group that has been changed from the hydrophilic group by the change of pH described above.

The electrodeposition polymer preferably has a ratio of the number of the hydrophobic groups to the total number of the hydrophilic groups and the hydrophobic groups of from 40 to 80%. When the number of the hydrophobic groups is less than 40% of the total number of the hydrophilic groups and the hydrophobic groups, there may be the case where the electrodeposition film formed by electrodeposition is short in water resistance and film strength. When the number of the hydrophobic groups is more than 80% of the total number of the hydrophilic groups and the hydrophobic groups, since the solubility of the polymer in the aqueous liquid becomes insufficient, the electrodeposition solution is turbid, a precipitate of the electrodeposition material is formed, or the viscosity of the electrodeposition solution is increased. Therefore, the ratio of the hydrophobic groups is preferably within the range described above. When the ratio is in the range described above, since the electrodeposition potential can be decreased, a low voltage image formation process utilizing a photoelectromotive force is conducted with good conditions. The ratio of the number of the hydrophobic group to the total number of the hydrophilic groups and the hydrophobic groups is more preferably from 55 to 70%. A polymer having the ratio within this range has a high electrodeposition efficiency and exhibits the electrodeposition characteristics of being capable of forming a film at a low electrodeposition potential, and the liquid property of the electrodeposition solution containing such a polymer is stable.

Figure 4:
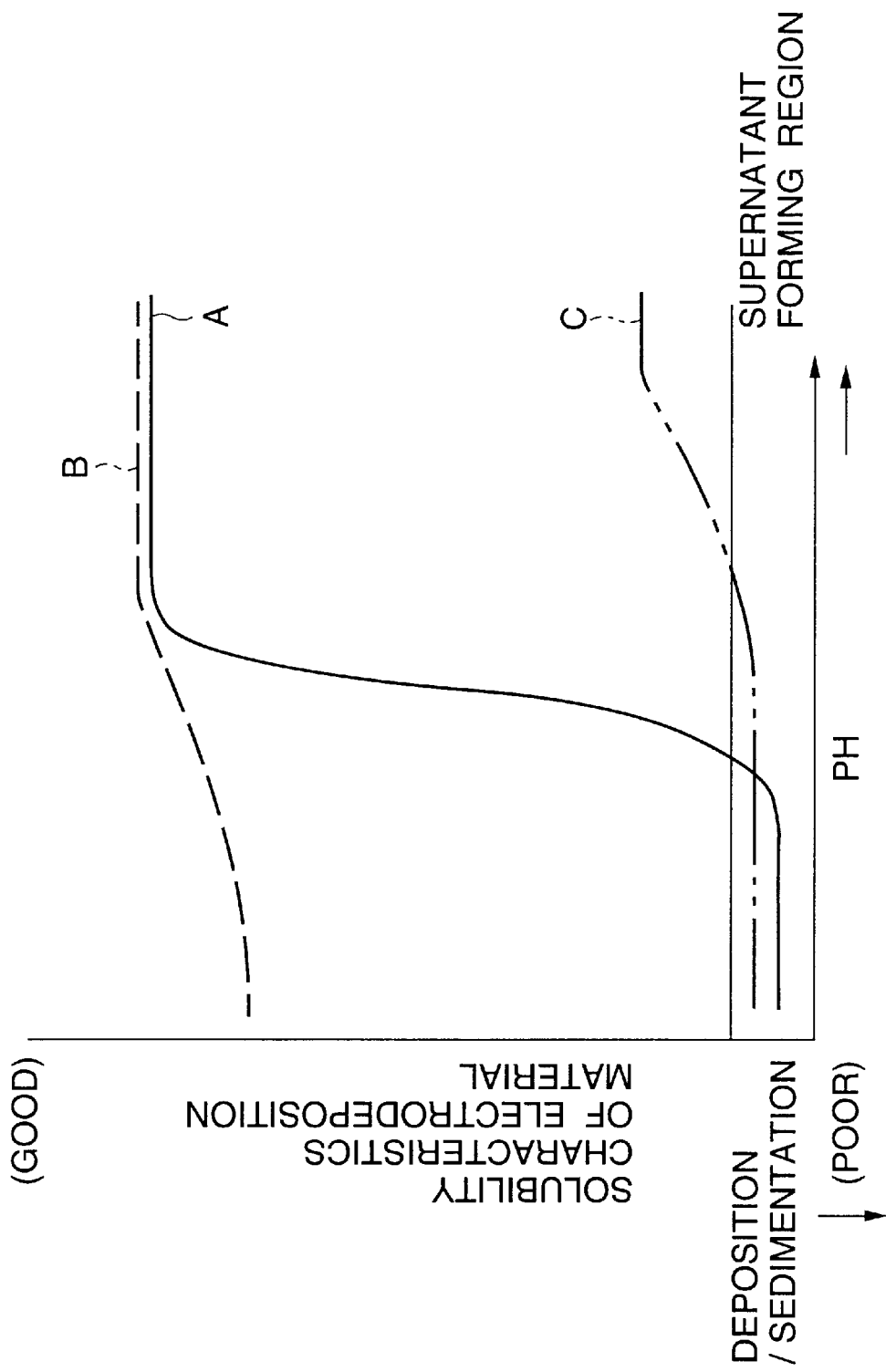
FIG. 4 is a graph showing a change in solubility characteristics of electrodeposition materials of the invention, which have different ratios of a hydrophobic group to the total of a hydrophobic group and a hydrophilic group, depending on the change of pH.

FIG. 4 is a graph showing the relationship between the change of pH of a solution of the electrodeposition polymer and the solubility characteristics of the electrodeposition polymer with various ratios of the number of the hydrophobic groups to the total number of the hydrophilic groups and the hydrophobic groups contained in the electrodeposition polymer. In the figure, the curve A shows the relationship for a polymer having a ratio of the number of the hydrophobic groups to the total number of the hydrophilic groups and the hydrophobic groups of 70%, the curve B shows the relationship for a polymer having the ratio of 12%, and the curve C shows the relationship for a polymer having the ratio of 83%. The polymer of the curve A exhibits a rapid decrease in solubility by decreasing the pH within a narrow pH range, and the difference in solubility is large. It is thus demonstrated that when the polymer of the curve A is used in the process for producing a color filter according to the invention, excellent electrodeposition characteristics are exhibited. On the other hand, the polymer of the curve B lowers in solubility by decreasing the pH, but the change is not rapid, and the polymer of the curve C does not exhibit any significant difference in solubility characteristics by the change of pH. Therefore, the electrodeposition property of the polymers of the curves B and C is not sufficient.

The polymer containing a hydrophobic group and a hydrophilic group in the molecule thereof is produced, for example, by subjecting a monomer having a hydrophobic group and a monomer having a hydrophilic group to random copolymerization.

Examples of the hydrophilic group contained in the electrodeposition polymer used in the invention include a carboxyl group and a hydroxyl group originated from methacrylic acid, acrylic acid, hydroxyethyl methacrylate, acrylamide, maleic anhydride, trimellitic anhydride, phthalic anhydride, hemimellitic acid, succinic acid, adipic acid, propiolic acid, propionic acid, fumaric acid and itaconic acid, and a group derived from these groups. In particular, those originated from methacrylic acid and acrylic acid exhibit a high electrodeposition efficiency by the change of pH and have a high efficiency of imparting the hydrophilic property. The hydrophilic group contained in the electrodeposition polymer used in the invention also includes an amino group and an imino group. A carboxyl group imparts an anionic property to the electrodeposition polymer, and an amino group or an imino group imparts a cationic property to the electrodeposition polymer.

Examples of the hydrophobic group contained in the electrodeposition polymer used in the invention include groups originated from an alkyl group, styrene, α-methylstyrene, α-ethylstyrene, methyl methacrylate, butyl methacrylate, acrylonitrile, vinyl acetate, ethyl acrylate, butyl acrylate and lauryl methacrylate. In particular, a group originated from styrene or α-methylstyrene has a high efficiency of imparting the hydrophobic property, and has a high electrodeposition efficiency. Furthermore, the group originated from styrene or α-methylstyrene is useful because a polymer containing such a group exhibits a high controllability on production thereof.

Each of the hydrophobic group and the hydrophilic group may be used singly or in combination of two or more thereof.

It is preferred that 50% or more, more preferably 75% or more, of the total hydrophilic groups contained in the polymer can be reversibly converted to hydrophobic groups by the change of pH. When the number of the hydrophilic group that can be converted to hydrophobic groups by the change of pH is less than 50% of the total number of the hydrophilic groups, the deposition of the precipitate is liable to be slow, and the number of such a groups is more than 75%, the deposition of the precipitate becomes too rapid, thereby lowering the stability. Therefore, the ratio of the groups is preferably within the range described above.

Examples of the hydrophilic group that can be reversibly converted to a hydrophobic group by the change of pH include a carboxyl group, an amino group and an imino group. In particular, a carboxyl group and an amino group have a high efficiency of being reversibly converted to a hydrophobic group, and exhibit a high deposition efficiency of a film on the electrodeposition phenomenon, and thus an electrodeposition film having a high durability is produced.

As the electrodeposition polymer used in the invention, a polymer containing a carboxyl group in the molecule thereof is preferably used. The polymer, which is of a type of depositing an image on an anode, preferably has an acid value of from 60 to 300 from the standpoint of electrodeposition characteristics. In particular, when a polymer having an acid value of from 90 to 195 is used, excellent electrodeposition characteristics can be obtained. When the acid value of the polymer containing a carboxyl group is less than 60, the solubility in an aqueous liquid is insufficient, and the electrodeposition solution is turbid or forms a precipitate. Furthermore, there may be the cases where the viscosity of the electrodeposition solution is increased, and the concentration of the solids content of the electrodeposition solution cannot be increased to the proper level. When the acid value exceeds 300, there may be the cases where the water resistance of the film thus formed is low, and the electrodeposition efficiency per unit electricity applied is low.

Because the electrodeposition polymer containing a carboxyl group has a high efficiency of converting the hydrophilic group to the hydrophobic group by the change of pH, and the pigment is excellent in light resistance and weather resistance, it is preferred to use them in combination in the invention.

The electrodeposition polymer used in the invention preferably has a number average molecular weight of from 6,000 to 25,000 from the standpoint of the characteristics of the film formed by electrodeposition and the adhesive strength of the film. The number average molecular weight is more preferably from 9,000 to 20,000. When the number average molecular weight is less than 6,000, the film is liable to be non-uniform and to have a low water resistance, and an electrodeposition film having a high durability cannot be obtained but the film property is poor, whereby it becomes powdered. When the number average molecular weight exceeds 25,000, the solubility in the aqueous liquid becomes insufficient, the electrodeposition solution is turbid, a precipitate of the electrodeposition material is formed, or the viscosity of the electrodeposition solution increases.

With respect to the thermal characteristics of the electrodeposition polymer, when a material having a glass transition point of less than 100° C., a flow initiating point of less than 180° C. and a decomposition point of higher than 150° C., severe controlling conditions are not necessary on heat transfer of a color filter film formed on the photosemiconductor thin film to another substrate, and the color filter thus transferred has a high light transmissibility, so as to obtain good transfer characteristics.

Figure 5:
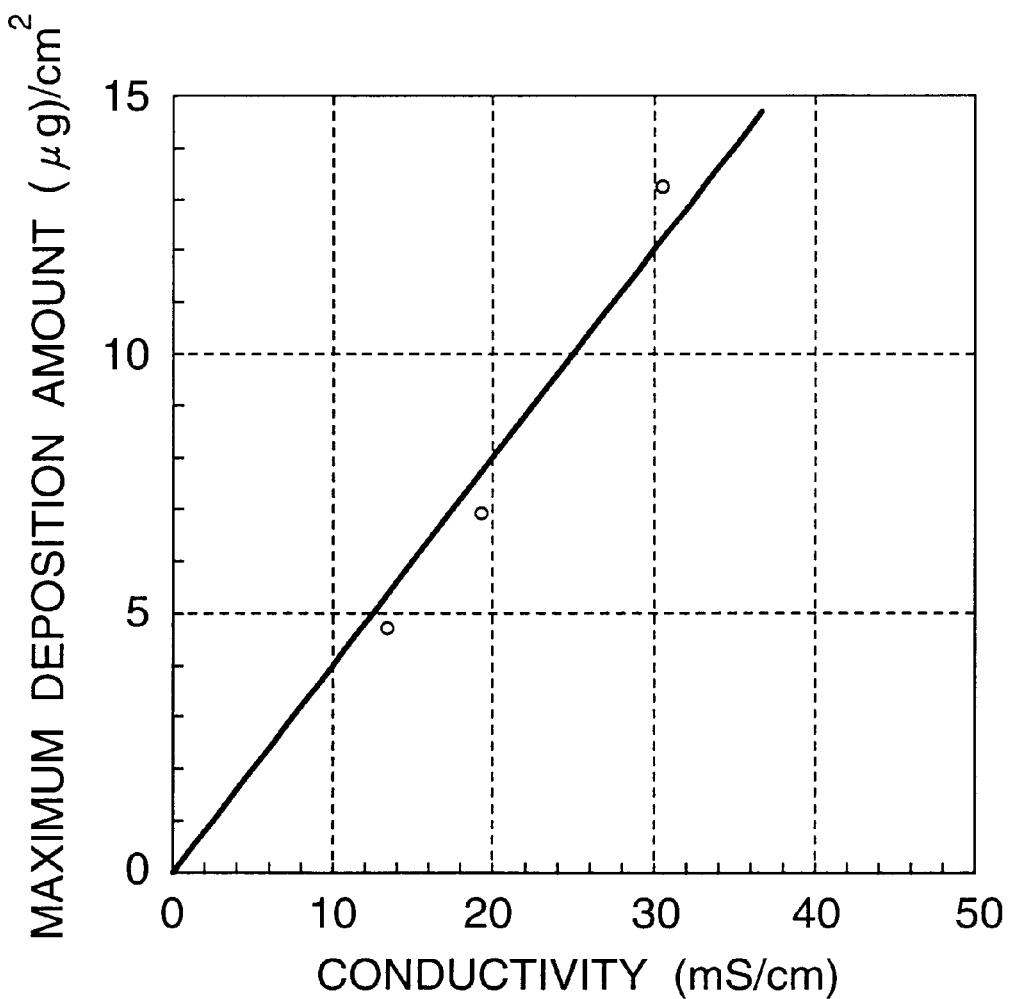
FIG. 5 is a graph showing a relationship between a electrodeposition amount and a conductivity.

The relationship between the conductivity and the pH of the electrodeposition solution for a filter will be described below. As a result of an experiment, the conductivity corresponds to the electrodeposition rate, and in relation to the electrodeposition amount, the higher the conductivity (1/resistivity) is, the thicker the electrodeposition film formed in a unit period of time. The electrodeposition amount has a tendency in that it is saturated at a volume resistivity of about $10^0$ Ω·cm. When the resistivity of the electrodeposition solution is larger than $10^6$ Ω·cm, a sufficient electric current cannot be obtained, and the electrodeposition amount is liable to be short. When the resistivity of the electrodeposition solution is smaller than $10^6$ Ω·cm, the electrodeposition amount becomes difficult to be controlled. Thus, the volume resistivity is preferably from $10^0$ to $10^6$ Ω·cm. FIG. 5 shows the relationship between the conductivity (1/resistivity) and the electrodeposition amount.

Therefore, in the case where the conductivity is short with the ion contained in the colored electrodeposition material, the electrodeposition rate can be controlled by adding an ion that does not influence the electrodeposition, such as an $Na^+$ ion and a $Cl^-$ ion.

Furthermore, the pH of the aqueous solution also influences the formation of the electrodeposition film. For example, when the formation of the electrodeposition film is conducted under the condition of the pH of the electrodeposition solution in that the solubility of the colored electrodeposition material, i.e., the coloring matter molecule and the electrodeposition polymer, is saturated, the re-dissolution of the electrodeposition film after the formation of the electrodeposition film is difficult to occur. On the other hand, when the formation of the electrodeposition film is conducted under the condition of the pH of the electrodeposition solution in that the solubility does not reach the saturation, the electrodeposition film once formed may be re-dissolved when the application of electricity is terminated. Therefore, it is preferred that the formation of the electrodeposition film is conducted under the condition of the pH of the electrodeposition solution in that the solubility of the colored electrodeposition material in the electrodeposition solution is saturated.

In the process for producing a color filter according to the invention, it is preferred that a bias voltage of 5 V or less is applied to the conductive film in the step of forming the colored electrodeposition film. When the bias voltage exceeds 5 V, bubbling may occur to form unevennesses and chipping in the colored electrodeposition film.

The combination of the photosemiconductor thin film and the colored electrodeposition material will be described. In the invention, as described in the foregoing, a Schottky barrier formed at a contact interface between the semiconductor and the electrodeposition solution, and a pn junction and a pin junction known as a solar sell are utilized to generate a photoelectromotive force.

An n-type semiconductor will be described as one example. In the case where a Schottky barrier is present between an n-type semiconductor and a solution, when the photosemiconductor is negative, an electric current flows in a forward direction, but when the photosemiconductor is positive, no electric current flows. However, even under the condition in that no electric current flows with the semiconductor being positive, when it is irradiated with light, an electron/hole pair is formed, and the hole migrates to the solution, so as to flow an electric current. In this case, since the photosemiconductor electrode is made positive, a material to be subjected to electrodeposition must be a negative ion. Therefore, for example, the n-type photosemiconductor and an electrodeposition polymer containing a carboxyl group are used in combination.

On the other hand, in the case where a p-type photosemiconductor is used, the photosemiconductor is irradiated with light with being made negative, and an electrodeposition solution containing a cationic molecule, such as an electrodeposition polymer containing an amino group or an imino group, is used.

In the case where a photosemiconductor having a pn junction or a pin junction and an electrodeposition solution containing an anionic molecule are used, the n-side of the photosemiconductor is immersed in the electrodeposition solution, and a voltage is applied in such a manner that the photosemiconductor becomes positive.

In the case where a photosemiconductor having a pn junction or a pin junction and an electrodeposition solution containing a cationic molecule are used, the p-side of the photosemiconductor is immersed in the electrodeposition solution, and a voltage is applied in such a manner that the photosemiconductor becomes negative.

In the filter according to the invention, electrodeposition films are formed for one color or two or more colors necessary for the filter, for example, three colors of red (R), green (G) and blue (B), by utilizing the photoelectrodeposition process described above.

While the electrodeposition film obtained by drying the colored electrodeposition film formed according the process described above has a sufficient strength, the electrodeposition film immediately after the electrodeposition has an insufficient strength. Therefore, it is preferred to conduct reinforcement of the film thus electrodeposited, and in order to realize the reinforcement, it is recommended that the pH of the electrodeposition solution contained in the electrodeposition film is maintained to a value lower than the pH, at which the aggregation is initiated. For example, in the case where a substance, the solubility or dispersibility of which to the electrodeposition solution is decreased with the decrease of pH, is contained as the colored electrodeposition material, the strength of the electrodeposition film is increased by treating the electrodeposition film with a liquid having a pH value lower than the pH of the electrodeposition solution, at which the aggregation is initiated. In this case, the solidification of the electrodeposition film is accelerated by contact with such a liquid, and the durability and the resolution of the electrodeposition film are improved, so as to obtain an image of the color filter of a high quality image.

The liquid used for the treatment described above preferably has a pH value that is shifted by 2 or more in terms of pH value from the pH of the aggregation initiation point of the electrodeposition solution toward the side where aggregation is liable to occur.

An unnecessary electrodeposition solution is attached to various parts of the electrodeposition substrate immediately after the electrodeposition. In order to completely remove the unnecessary electrodeposition solution, it is effective to wash out the substrate with a liquid. In particular, washing with an inert liquid having a light transmissibility and a high safety is effective.

It is preferred to simultaneously conduct the reinforcement of the electrodeposition film and the washing and removal of the unnecessary electrodeposition solution immediately after electrodeposition since the number of steps can be reduced. In order to simultaneously conduct them, it is preferred to use, as the washing liquid, an aqueous washing liquid having a pH value that is shifted from the pH of the aggregation initiation point of the electrodeposition solution toward the side where aggregation is liable to occur. By contacting with such a washing liquid, the solidification of the electrodeposition film is accelerated, and the colored electrodeposition material component of the unnecessary electrodeposition solution is aggregated to lose the disposition capability and is easily washed out.

As such a washing liquid, pure water containing a pH adjusting agent, such as HCl, $H_2SO_4$, KOH and NaOH, may be used, to which a washing component, such as an alcoholic solvent, a polyhydric alcoholic solvent, a ketone solvent and a surface active agent, may be added.

Figure 6:
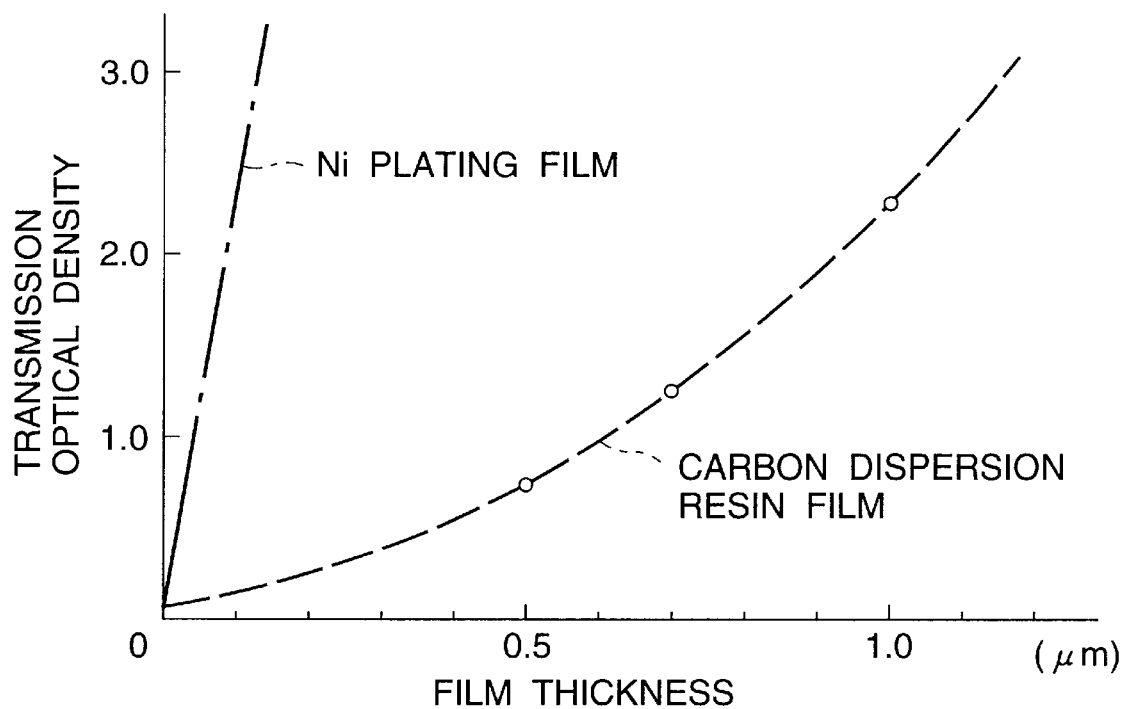
FIG. 6 is a graph showing a relationship between a thickness of a black matrix and a transmission optical density.

The method for forming the black matrix in the invention will be described. An Ni plating film and a film comprising a resin having carbon black dispersed therein are compared with reference to the figure. It is understood from FIG. 6 that the Ni plating film has a high light shielding property with an extremely small thickness, and for example, a thickness realizing a transmission optical density (−log R) of 2.5 of the Ni plating film is about $\frac{1}{10}$ of that of the carbon black resin film. Accordingly, in order to attain the same light shielding property, the metallic plating film may be extremely thin in comparison to the carbon black resin film. Because the metallic plating film can realize a high light shielding property with a thin film, a color filter with high precision can be produced. According to the invention, a sufficient light shielding property can be obtained with a thickness that is $\frac{1}{5}$ of the thickness of the related resin series black matrix.

Figure 7:
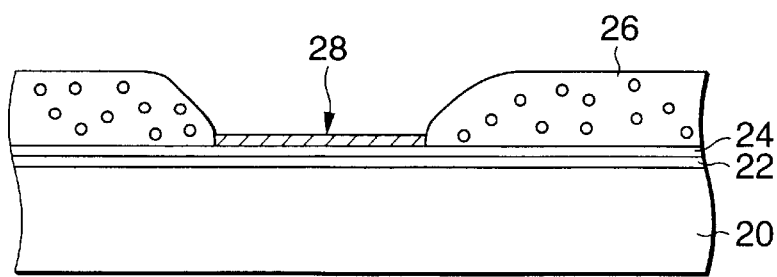
FIG. 7 is a schematic cross sectional view showing a boundary between the black matrix comprising a metallic plating film and a filter part.
Figure 8:
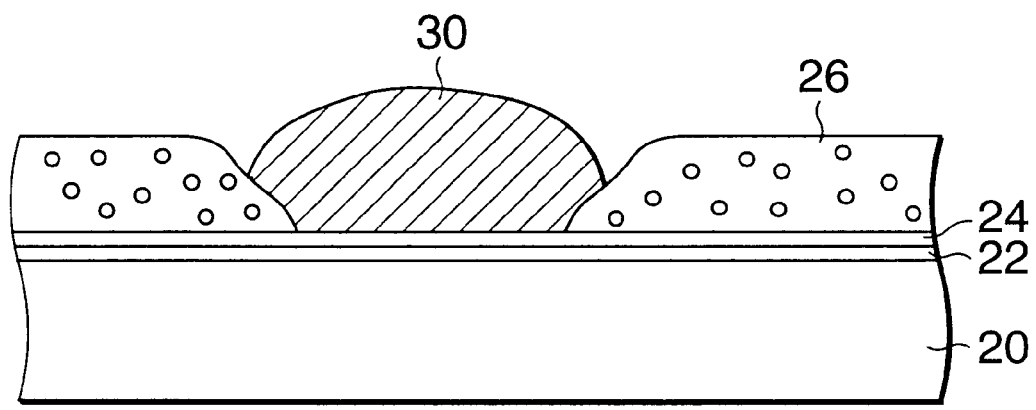
FIG. 8 is a schematic cross sectional view showing a boundary between a resin dispersion series black matrix and a filter part.

FIG. 7 is a schematic cross sectional view showing the boundary region between a black matrix and a color filter part in the case where the black matrix comprises a metallic plating film, and FIG. 8 is a schematic cross sectional view showing that in the case where the black matrix comprises a resin film having carbon black dispersed therein. In the figures, numeral 20 denotes a light transmissible support, 22 denotes a light transmissible conductive film, 24 denotes a photosemiconductor thin film, 26 denotes a filter part, 28 denotes a metallic plating black matrix part, and 30 denotes a resin series black matrix part. It is understood from the difference between FIG. 7 and FIG. 8 that in the case of the resin series black matrix part, the black matrix part and the color filter part are formed as overlapping each other, thereby making the light transmissibility vague, whereas in the case of the metallic plating, a clear boundary is formed by the edge parts of the filter part and the black matrix part, and the optical vagueness in the resin series black matrix is decreased. Furthermore, leakage of light at the edge part of the color filter can be decreased. When the black matrix is formed with metallic plating after the formation of the color filter layer, a self-restoration effect of the pattern is obtained, and unfavorable phenomena such as leakage of light can be eliminated to improve the optical performance of the filter.

Since the thickness of the metallic plating film is proportional to the electric current applied, the film thickness thereof is uniform and is easily controlled.

The metallic plating film is subjected to crystallization simultaneously with the growth of the film, and therefore the film obtained becomes a polycrystalline film. Thus, a high light shielding property can be obtained in the region of the visible rays. In order to obtain a black mask having a high light shielding property, it is preferred to use a metal having a crystallinity as high as possible. Examples of such a metal include Ni, Cr, Cu, Au, Ag, Mo, Sn, Zn and Co. Because there is a tendency that the crystallinity of the metallic plating layer is determined by the influence of the crystallinity of the subbing layer, the photosemiconductor thin film preferably has a high crystallinity, such as a single crystal, microcrystals or polycrystals.

The adhesion strength between the metallic plating film and the subbing layer (photosemiconductor film) is extremely large because the metallic plating film is formed in the mode near epitaxial growth.

In the process for producing a color filter using the photoelectrodeposition method according to the invention, the photosemiconductor is exposed at a part on which the photoelectrodeposition film is not formed, and a metallic plating film for the black matrix can be easily formed on that part. Because the electrodeposition film of the color filter generally has a high insulating property, the metallic plating film is not formed as laminated over the color filter layer. Therefore, after forming the color filter layer by the photoelectrodeposition method, a voltage is applied in a metallic plating solution for the black matrix (at which light irradiation is not necessary), so that the region where the color filter is not present is completely buried with the metallic plating.

In the invention, a black matrix of a metallic plating film can be formed before the formation of a color filter layer. In this method, an electrodeposition substrate is arranged in such a manner that a photosemiconductor thin film is immersed in a metallic plating solution, and is then subjected to imagewise exposure with applying a voltage or an electric current to a conductive film, and thus a black matrix comprising a metallic plating film is formed only on a part not irradiated with light. Thereafter, the electrodeposition substrate is arranged in such a manner that the photosemiconductor thin film is immersed in an electrodeposition solution containing a colored electrodeposition material, and is then subjected to imagewise exposure with applying a voltage or an electric current to the conductive film, and thus a colored electrodeposition film is formed only on a part irradiated with light. Because the resistance of the metallic film thus plated is low to cause diffusion of the generated electric current, an unnecessary electrodeposition film is not laminated over the metallic plating film. This is another advantage of using the metallic plating method for the formation of the black matrix.

According to this method, the color filter having the equivalent performance as that obtained by the method described in the foregoing can be produced with a low cost by utilizing the photoelectrodeposition method and the metallic plating method.

In the case where the color filter layer is firstly formed and an electrodeposition polymer containing a carboxyl group is used, the metallic plating solution is preferably acidic. This is because an acidic plating solution is small in adverse influence on the filter electrodeposition film. In the case where the black matrix is firstly formed and an electrodeposition polymer containing a carboxyl group is used, it is not recommended to use an amphoteric metallic system as the plating metal. This is because the electrodeposition solution containing an electrodeposition polymer having a carboxyl group is generally weakly alkaline. Since various kinds of aqueous solutions are used in the process for producing a color filter according to the invention, it is preferred to use a metal having a high durability, such as Ni, Cr, Cu, Au, Ag, Mo, Sn, Zn, Co, Ti, Ta, Pb and Ru, or an alloy thereof.

The metallic plating film of the black matrix of the invention preferably has a thickness in the range of from 70 to 900 nm (from 0.07 to 0.9 $\mu$m). When it is thinner than 70 nm, the light shielding effect as the black matrix cannot be obtained, and when it exceeds 900 nm, the optical sharpness described above becomes insufficient.

Figure 9A:
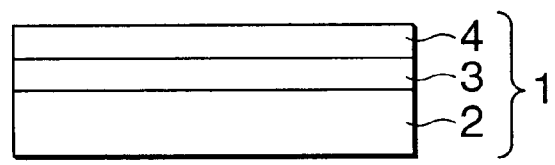
FIGS. 9A to 9E are schematic cross sectional views showing one embodiment of the process for producing a color filter according to the invention.
Figure 9B:
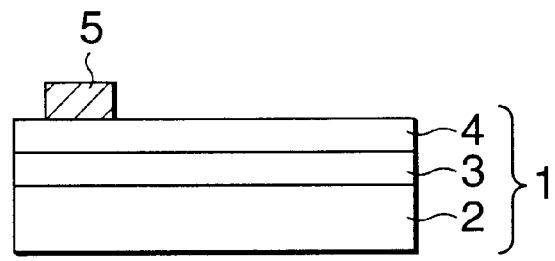
Figure 9C:
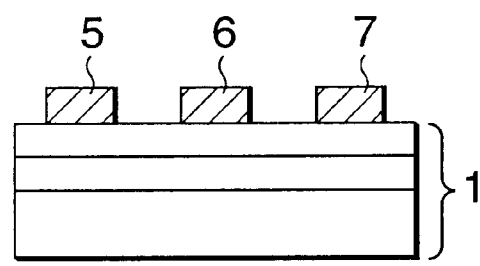
Figure 9D:
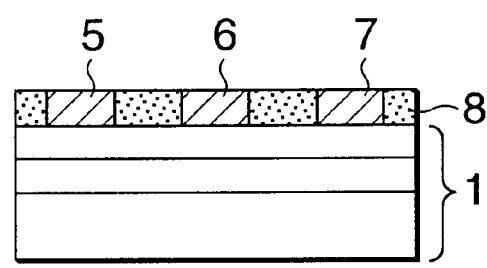
Figure 9E:
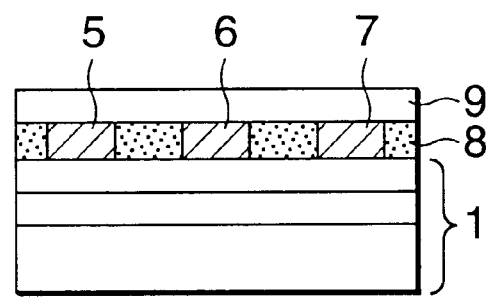

The process for producing a filter according to the invention has been described in detail above, which is then summarized with reference to the figures. FIGS. 9A to 9E show an example of the process where the filter part is firstly formed, and FIGS. 10A to 10E show an example of the process where the black matrix is firstly formed. In the method where the color filter part is firstly formed, an electrodeposition substrate 1 is prepared, which comprises a light transmissible support 2 having a light transmissible conductive film 3 and a photosemiconductor thin film 4 with a photoelectromotive function in this order laminated thereon as shown in FIG. 9A. A filter part 5 is then formed according to the photoelectrodeposition method of the invention as shown in FIG. 9B, and filter parts 6 and 7 of other colors are formed as shown in FIG. 9C. Thereafter, a black matrix 8 is formed by metallic plating among the color filter part as shown in FIG. 9D, and finally a protective layer 9 is formed on the surface of the layer comprising the color filter and the black matrix as shown in FIG. 9E.

In the method where the black matrix is firstly formed, a black matrix is firstly formed by metallic plating as shown in FIG. 10B', color filters are formed according to the photoelectrodeposition method of the invention as shown in FIGS. 10C' and 10D', and finally a protective layer is formed as shown in FIG. 10E'.

Figure 11:
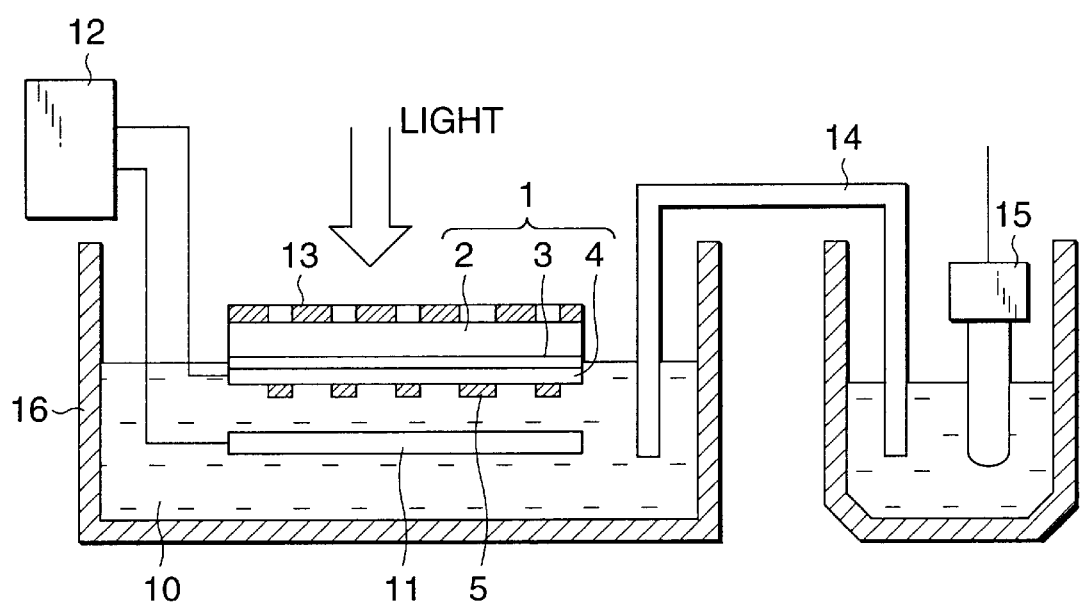
FIG. 11 is a schematic diagram showing an experimental apparatus for producing a filter by the photoelectrodeposition process according to the invention.

As an experimental apparatus for forming a color filter part by the electrodeposition method in the invention, an apparatus having the three-electrode arrangement shown in FIG. 11 is exemplified. In FIG. 11, numeral 5 denotes an electrodeposition film, 10 denotes an electrodeposition solution, 11 denotes a counter electrode such as a Pt electrode, 12 denotes means for applying a bias voltage such as a potentiostat, 13 denotes a photomask, 14 denotes a salt bridge, 15 denotes a control electrode such as a caromel electrode, and 16 denotes an electrodeposition bath.

When the substrate is irradiated with light from the side of the light transmissible support through the photomask with applying a bias voltage by a potentiostat for example, a photoelectromotive force is generated at a part of the photosemiconductor thin film of the electrodeposition substrate that is irradiated with light, whereby an electric potential becomes slightly higher than the electrodeposition electric potential. Thus, the pH of the aqueous liquid in the vicinity of the light irradiated part of the photosemiconductor thin film is changed as described above to decrease the solubility of the colored electrodeposition material (the ionic polymer and/or the coloring matter ion), and as a result, a colored electrodeposition film is formed only on the light irradiated part. In order to produce a color filter, electrodeposition films are formed in such a manner that the operation described above is repeated with changing the photomask and the electrodeposition solution for red (R), green (G) and blue (B) for example.

As an apparatus for conducting metallic plating in the invention, the similar apparatus above can be used.

The irradiation with light, i.e., exposure, is conducted from the back surface of the support through the photomask. Any light source can be used as far as it can provide light having a wavelength, at which the photosemiconductor used has sensitivity. For example, a mercury vapor lamp, mercury-xenon vapor lamp, an He-Cd laser, an $N_2$ laser and an excimer laser, which are capable of emitting light having a wavelength of 400 nm or less. Furthermore, only the necessary part of the substrate may be directly irradiated with laser light based on a digital signal without a photomask.

According to the production process of the invention, the electrodeposition substrate having thereon the color filter part and the black matrix can be used as a color filter as it is, and thus transfer to another light transmissible substrate is not necessary. It is also possible that the layer comprising the color filter part and the black matrix is transferred to another substrate with heat and pressure to be used as a color filter. In this case, the electrodeposition substrate can be used repeatedly. In the case where the transfer is conducted, because the resulting color filter does not have any photo-semiconductor thin film absorbing light, a color filter having better light transmissibility and better precision can be obtained.

Figure 12:
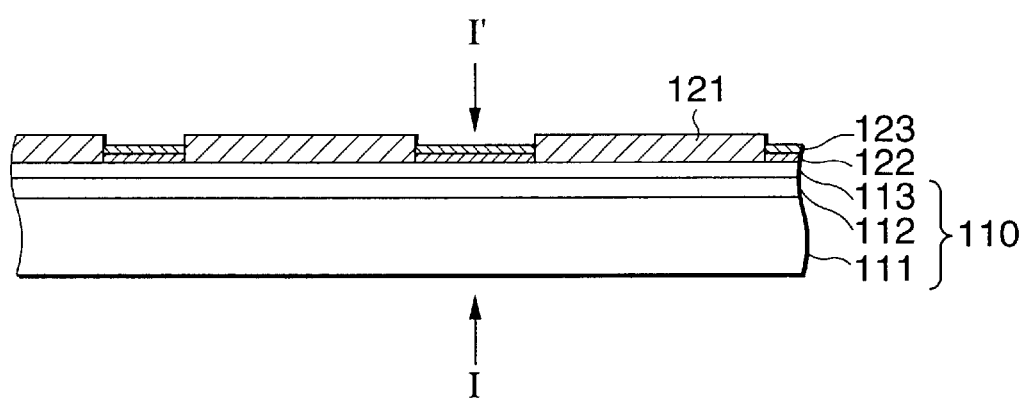
FIG. 12 is a schematic cross sectional view showing one embodiment of a color filter according to the invention.

As shown in FIG. 12, the color filter of the invention may have a structure comprising a black thin film 122 comprising a resin containing a black coloring material and a metallic plating thin film 123 laminated to each other. For example, the resin series black thin film containing the black coloring material such as carbon black has a high light absorbing property, but in order to completely cut off light, a certain film thickness is necessary. On the other hand, the metallic plating thin film exhibits a high light shielding property even when the film thickness is small. However, because the metallic plating thin film has a light reflectivity to light incident from the outside, a color filter having a black matrix composed only of a metallic plating thin film becomes entirely whitish, and there may be the case where the optical characteristics are deteriorated. In the color filter of the invention, the external light from the direction I is absorbed by the black resin series thin film, and reflection by the metallic plating thin film substantially does not occur. On the other hand, the transmission light from the direction I' is shielded by the metallic plating thin film. Therefore, the color filter of the invention has good optical characteristics. The thickness of the black matrix layer is preferably from 70 to 900 nm. When the thickness exceeds 900 nm, there may be the case where a sufficient optical S/N ratio cannot be obtained. When it is less than 70 nm, the light shielding property maybe insufficient. Therefore, the thickness is preferably within the range described above.

The black matrix layer is not limited to the two-layer structure comprising t he black thin film layer comprising a resin containing a black coloring material and the metallic plating layer laminated to each other, but may comprise a three-layer structure having a black thin film layer formed further thereon. The use of such a three-layer structure is preferred since light scattering due to surface reflection is further lowered.

In FIG. 12, numeral 110 denotes a substrate, 111 denotes a support, 112 denotes a conductive film, 113 denotes a photosemiconductor thin film, and 121 denotes a color filter.

Because a metallic thin film formed by plating of a metal only has a large light shielding property, a sufficient light shielding property can be obtained with a thickness being ⅕ or less of the thickness of the related film composed only of a resin layer having a pigment dispersed therein, so as to realize a thin film structure. Accordingly, the width of a tapered part at the edge of the film can be suppressed to small, and not only the dimensional reliability of the micro-width structure of the filter part is improved, but also the optical characteristics of the filter, such as decrease in leakage of light at the edge part of the filter part, can be improved.

According to the dispersion plating method, a composite phase comprising a metallic matrix having particles of a coloring material such as a black pigment irregularly dispersed therein is formed. While the performance deterioration due to reflection of external light has been unavoidable, by such a dispersion composite structure of the particles of the pigment having a large light absorbing property, the direct reflection phenomenon, which is a cause of the characteristics deterioration of the black matrix, is prevented by the light absorption of the pigment itself and the absorption and random reflection of external light due to the effect provided by fine unevenness formed on the surface of the metallic thin film by the particles contained in the thin film, so that a thin film having both the functions of light shielding and prevention of reflection of light can be obtained in one step.

As the metallic plating solution for dispersing the coloring material particles, one of an acidic series is preferred, which also has an advantage of exhibiting less adverse influence to the optical filter electrodeposition film. Therefore, as the plating metal, an amphoteric metallic system is difficult to be used, but a plating metal having a high durability by itself is preferably used. Examples of the matrix metallic material that is preferably used include a metal selected from Ni, Cr, Cu, Au, Ag, Mo, Sn, Zn, Co, Ti, Ta, Pb and Ru, an alloy of plural metals, and a mixed body of plural metals.

Examples of the preferred material of the coloring material particles include, with considering the light absorption property, various kinds of carbon black, black iron oxide, an azo pigment, a phthalocyanine pigment, a metallic complex pigment, a condensed polycyclic pigment and a lake pigment, and particles formed by dispersing one or plural kinds thereof in a resin can be selected as the dispersed coloring material particles.

The average particle diameter of the coloring material particles is preferably in the range of from 5.0 nm to 0.7 $\mu$m, and particularly when it is in the range of from 10 to 300 nm, a higher efficiency is obtained. When the average particle diameter is less than 5.0 nm, a large cost and a large apparatus are required to obtain coloring material particles having a uniform particle shape, whereas when it exceeds 0.7 $\mu$m, optical scattering occurs and light transmissibility is difficult to be obtained, and thus both the cases are not preferred.

The amount added of the coloring material particles is not particularly limited and can be appropriately selected depending on the objective use. From the standpoint of prevention of reflected light, which is one of the objects of the invention, the addition of a several percent by weight is sufficient, and it is preferably from 5 to 50% by weight, and more preferably from 15 to 40% by weight. When the addition amount is too small, the effect obtained becomes insufficient, whereas when it is too large, a large amount of energy is required to disperse in the plating solution, and uniform dispersion becomes difficult, which causes a possibility of deterioration of uniformity of the black matrix layer, and thus both the cases are not preferred.

In the method for plating a metal having the coloring material particles dispersed therein, the coloring material particles are mixed with a general metallic plating bath, the dispersion state of the coloring material particles in the plating bath is maintained by stirring on forming a plating film. The stirring conditions of the bath can be appropriately selected from the known methods depending on the metallic matrix used and the types and shape of the coloring material particles.

By proceeding the plating with stirring, the coloring material particles are adsorbed on the surface of the growing metal to be incorporated therein in succession, and the coloring material particles are irregularly incorporated in the metallic plating film to form a coloring material dispersed in the metallic film. At the part on which the metallic plating film is formed, because the resistance of the metallic film is low and diffusion of the electric current generated by light occurs, there is a tendency in that the electrodeposition film is difficult to be unnecessarily laminated, which becomes an advantage of using the coloring material dispersion metallic plating method for the formation of the useful black matrix layer.

The black matrix layer formed with the coloring material particles-dispersed metallic plating film satisfying these conditions has a high light shielding property even though it is a single layer, and it has a sufficient light shielding property as the black matrix with a thickness of 0.5 $\mu$m or less. Therefore, the thickness of the black matrix layer becomes 1/3 or less of the related electrodeposition film type comprising a resin having carbon black dispersed therein. As a result, steps on the surface of the filter can be reduced to form a layer having a function of absorbing external light by the function of the colored particles, at a part at which the external light is incident, and not only the reliability of the formation of the filter layer, but also the leakage of light as the filter is decreased, so that the production of a high resolution color filter having a black matrix layer pattern with a pattern width of 10 $\mu$m or less becomes possible.

In the production process, the electrodeposition method having been proposed by the inventors can be used for the filter part, and the related metallic plating method can be used for the black matrix part only by adding the stirring operation. Thus, the film formation is easily conducted, with high reliability of the resulting black matrix part, and the layer is thin, so that the production of a color filter having a high resolution becomes possible.

Figure 13:
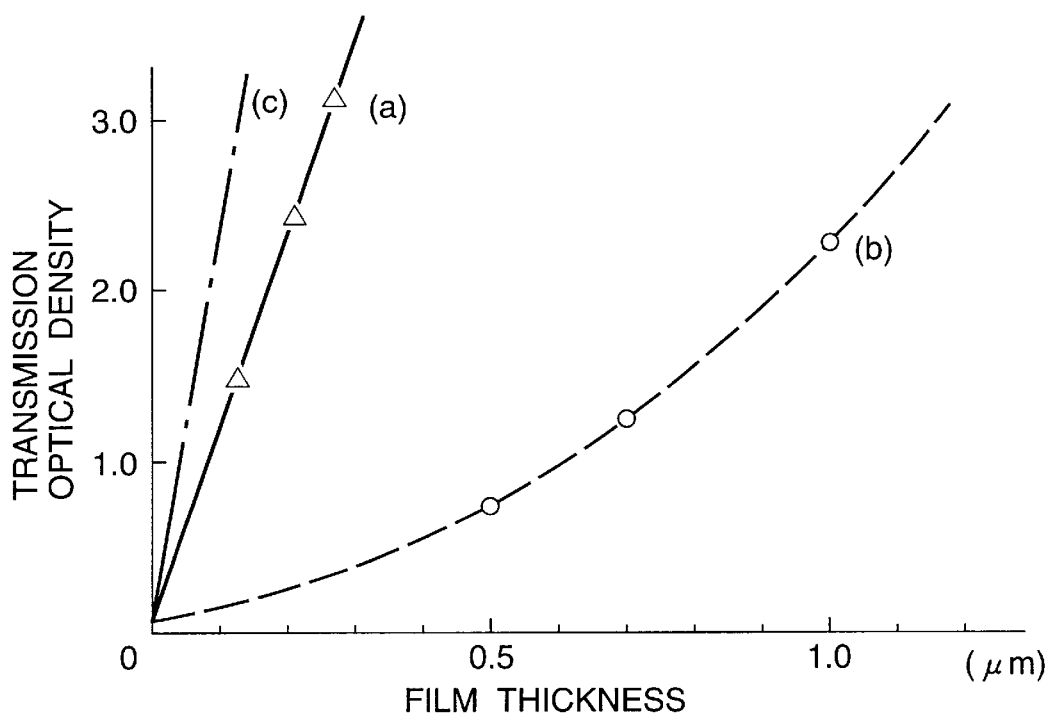
FIG. 13 is a graph showing a relationship between a film thickness and a transmission optical density for a general black electrodeposition film having carbon black dispersed therein, the black matrix film comprising a plating film having carbon black dispersed therein according to the invention, and a nickel plating film.

FIG. 13 is a graph showing the relationship between the film thickness and the transmission optical density for the related black electrodeposition film having carbon black with no functional group dispersed therein, the black matrix part formed by the complex plating method of the invention, and the single nickel plating film. In FIG. 13, the nickel plating layer containing the coloring material particles formed by the complex plating method of the invention is shown by triangles and a solid line (a), the related black electrodeposition film containing carbon black is shown by circles and a broken line (b), and the nickel plating layer is shown by the single-point chain line (c). It was confirmed that the thickness of the black matrix part obtained by the method of the invention can be made smaller than the related product. The metallic plating film is excellent in light shielding property with a small thickness, but since the film itself has a metallic gloss, there may be the case where it is unsuitable to be used singly.

Figure 14A:
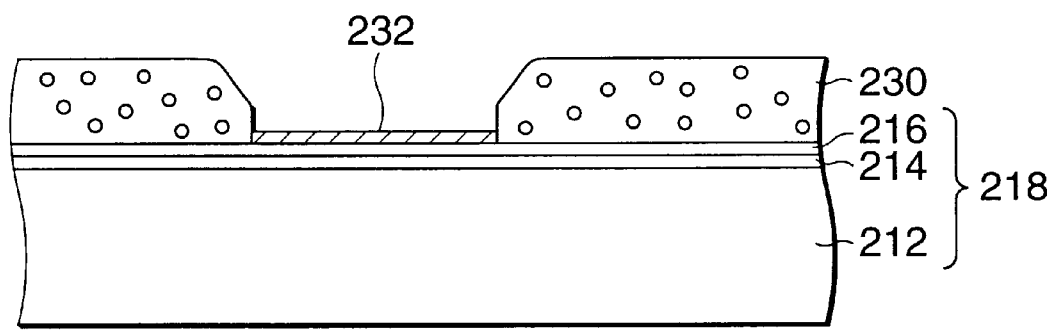
FIG. 14A is a schematic cross sectional view showing one embodiment of a black matrix and a filter layer obtained by the production process according to the invention.
Figure 14B:
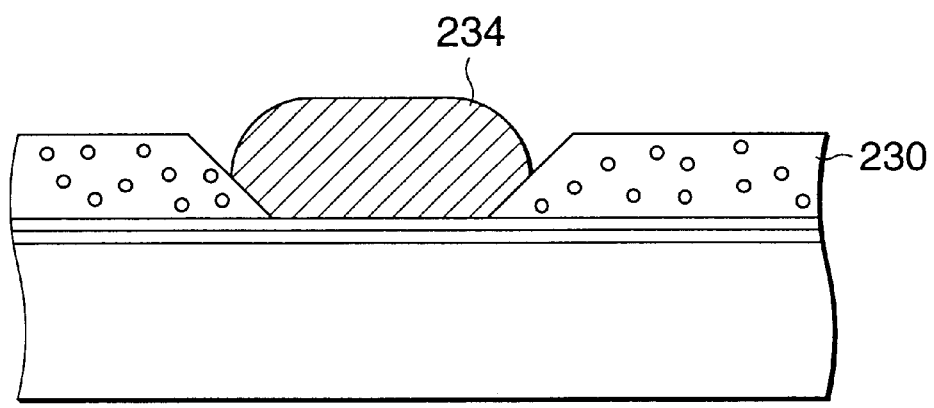
FIG. 14B is a schematic cross sectional view showing a related black matrix containing carbon black and a filter layer.

FIG. 14A is a schematic cross sectional view showing the black matrix obtained by the production process according to the invention and the filter layer provided around the black matrix. FIG. 15B is a schematic cross sectional view showing the related black matrix containing carbon black and the filter layer provided around the black matrix. FIG. 14A shows a colored film (filter part) 230 and a black matrix layer 232 formed by the complex plating method formed on a substrate 218 comprising a transparent support 212 having thereon a transparent conductive film 214 and a semiconductor thin film 216. FIG. 14B shows a related black electrodeposition film 234 as the black matrix layer. It is understood from the comparison of them that because the black matrix obtained by the method of the invention can exhibit an effect equivalent to the related product even though the layer is made thin, it is preferred from the standpoint of the resolution of the filter.

According the process of the invention, the color filter layer is formed by the photoelectrodeposition method. In this case, the semiconductor is exposed at the part where the photoelectrodeposition film has not been formed, and the electrodeposition film fort he black matrix can be easily formed on that part. In general an electrodeposition film has a high insulating property, and a photoelectrodeposition film is difficult to be formed as laminated over the color filter layer. Therefore, when after forming the color filter layer by the photoelectrodeposition method, a voltage is applied in the metallic plating solution for the black matrix, a carbon black thin film is buried on the region on which the color filter layer is not formed regardless of the presence or absence of light and an electric field. Accordingly, a thin film color filter having a high performance can be formed with one step by utilizing the dispersion plating method for the black matrix layer.

The invention will be further described in more detail with reference to the examples, but the invention is not construed as being limited thereto.

EXAMPLE 1

A light transmissible conductive layer comprising ITO having a thickness of 0.1 $\mu$m was formed on a quartz glass support having a thickness of 1.5 mm by a sputtering method, and further a TiO$_2$ film having a thickness of 0.3 $\mu$m was formed by a sol-gel film forming coating method. A reducing treatment was then conducted to increase the photoelectric current characteristics of the TiO$_2$. The reducing treatment was conducted by annealing in a pure nitrogen gas added with 4% of a hydrogen gas at 460° C. for 10 minutes. The thus produced electrodeposition substrate was installed in an apparatus having the three-electrode arrangement generally employed in the field of electrochemistry shown in FIG. 12.

As an electrodeposition solution for forming a red filter, an aqueous dispersion (solids content concentration: 10% by weight, pH: 7.8) containing an electrodeposition polymer (a styrene-acrylic acid random copolymer, the number average molecular weight: 16,000, styrene content: 65% by mole, acid value: 130, glass transition point: 45° C., flow initiating point: 95° C., decomposition point: 237° C., deposition initiating pH: 5.8) and an azo series super-fine particulated red pigment at a solids content ratio of 5/5 was used.

A voltage was applied to the ITO conductive film in such a manner that a bias potential difference of +1.6 V was formed on the photosemiconductor thin film (TiO$_2$ film) with respect to the saturated calomel electrode. The electrodeposition substrate was irradiated from the back surface (meaning the side of the light transmissible support of the electrodeposition substrate, hereinafter the same) with a mercury-xenon vapor lamp (produced by Yamashita Denso Corp., wavelength: 365 nm, light intensity: 50 mW/cm$^2$) for 4 seconds through a photomask for the red filter. The surface of the TiO$_2$ film was irradiated with the transmitted light, and a red mask filter pattern was formed only on the irradiated region. Thereafter, cascade washing with a pH adjusting liquid having a pH value of 4.2 was sufficiently conducted.

A green mask filter pattern was formed only on a region of the TiO$_2$ film irradiated with light in the same manner as in the formation of the red filter except that an aqueous dispersion (solids content concentration: 10% by weight, pH: 7.8) containing the same styrene-acrylic acid copolymer as the electrodeposition polymer and a phthalocyanine green series super-fine particulated pigment at a solids content ratio of 5/5 was used as an electrodeposition solution for forming a green filter, and the substrate was irradiated with the transmitted light for 5 second through a photomask for the green filter. Thereafter, cascade washing with a pH adjusting liquid having a pH value of 4.2 was sufficiently conducted.

A blue mask filter pattern was formed only on a region of the $TiO_2$ film irradiated with light in the same manner as in the formation of the red filter except that an aqueous dispersion (solids content concentration: 10% by weight, pH: 7.8) containing the same styrene-acrylic acid copolymer as the electrodeposition polymer and a phthalocyanine blue series super-fine particulated pigment at a solids content ratio of 5/5 was used as an electrodeposition solution for forming a blue filter; the substrate was irradiated with the transmitted light for 2 second through a photomask for the blue filter; and a voltage was applied to the conductive film in such a manner that the potential difference was +1.7 V. Thereafter, cascade washing with a pH adjusting liquid having a pH value of 4.2 was sufficiently conducted.

The whole of the electrodeposition substrate was immersed in an Ni plating solution (Ni ion concentration: 12.3%) having a pH value of 4.1 mainly comprising nickel sulfate, and nickel plating was conducted on the part other than the colored filter by applying a negative bias voltage of 1.7 V to the conductive film, to form a black matrix comprising an Ni plating film having a thickness of 0.2 μm. The Ni black matrix film had an optical transmission density of 3.2.

A silicone resin layer as a protective layer having a thickness of 50 Å was coated on the surface on which the colored electrodeposition films and the black matrix by plasma polymerization, so as to form a color filter.

The optical characteristics at the boundary between the filter part and the black matrix part of the color filter thus produced were evaluated, and it was found that high precision was realized as the deviation at the edge part of the boundary was 10 μm or less.

EXAMPLE 2

A light transmissible conductive film having a thickness of 0.2 μm comprising ITO was formed on a non-alkali glass support having a thickness of 1.2 mm by a sputtering method, and further a $TiO_2$ film having a thickness of 0.5 μm was formed by a sputtering method. In order to increase the photoelectric current characteristics of the $TiO_2$ film, annealing in a pure nitrogen gas added with 5% of a hydrogen gas was conducted at 420° C. for 20 minutes. The thus produced electrodeposition substrate was installed in an apparatus having the three-electrode arrangement generally employed in the field of electrochemistry shown in FIG. 12.

The whole of the electrodeposition substrate was immersed in a tin plating solution (Sn ion concentration: 7.3%) containing tin chloride having a pH value of 3.1 and a liquid temperature of 30° C., and the substrate was irradiated from the back surface of the substrate with a mercury-xenon vapor lamp (produced by Yamashita Denso Corp., wavelength: 365 nm, light intensity: 50 mW/cm$^2$) with applying a bias voltage of 2.0 V to the conductive film of the electrodeposition substrate. A plating electric current was applied for 15 seconds to form a thin and uniform film of a black matrix layer comprising a tin plating film having a thickness of 0.12 μm a surface, at which a photoelectric current was not generated. The optical transmission density of the black matrix film was 2.7.

Thereafter, a colored electrodeposition film was formed by using the same apparatus as above.

As an electrodeposition solution for forming a red filter, an aqueous dispersion (solids content concentration: 9.1% by weight, pH: 8.0) containing a styrene-acrylic acid random copolymer (the number average molecular weight: 14,000, styrene content: 73% by mol, acid value: 140, glass transition point: 52° C., flow initiating point: 97° C., decomposition point: 248° C., deposition initiating pH: 6.0) and an azo series super-fine particulated red pigment at a solids content ratio of 9/1 was used.

A voltage was applied to the ITO conductive film in such a manner that a bias potential difference of +1.8 V was formed on the photosemiconductor thin film ($TiO_2$ film) with respect to the saturated calomel electrode. The electrodeposition substrate was irradiated from the back surface of the substrate with a mercury-xenon vapor lamp (produced by Yamashita Denso Corp., wavelength: 365 nm, light intensity: 50 mW/cm$^2$) for 6 seconds through a photomask for the red filter, to form a red mask filter pattern only on the region of the surface of the $TiO_2$ film that was irradiated with light. Thereafter, the substrate was washed with a pH adjusting liquid having a pH value of 4.5.

A green mask filter pattern was formed only on a region of the $TiO_2$ film irradiated with light in the same manner as in the formation of the red filter except that an aqueous dispersion (solids content concentration: 9.2% by weight, pH: 8.0) containing the same styrene-acrylic acid copolymer as the electrodeposition polymer and a phthalocyanine green series super-fine particulated pigment at a solids content ratio of 8/2 was used as an electrodeposition solution for forming a green filter, and the substrate was irradiated with light for 7 second through a photomask for the green filter. Thereafter, the substrate was washed with a pH adjusting liquid having a pH value of 4.4.

A blue mask filter pattern was formed only on a region of the $TiO_2$ film irradiated with light in the same manner as in the formation of the red filter except that an aqueous dispersion (solids content concentration: 9.4% by weight, pH: 8.0) containing the same styrene-acrylic acid copolymer as the electrodeposition polymer and a phthalocyanine blue series super-fine particulated pigment at a solids content ratio of 8/2 was used as an electrodeposition solution for forming a blue filter; a bias voltage was applied to the conductive film in such a manner that the potential difference was +1.9 V; and the substrate was irradiated with light for 7 second through a photomask for the blue filter. Thereafter, the substrate was washed with a pH adjusting liquid having a pH value of 4.2. A silicone resin layer as a protective layer having a thickness of 50 Å was coated on the surface on which the colored electrodeposition films and the black matrix by plasma polymerization, so as to form a color filter.

EXAMPLE 3

A light transmissible conductive film having a thickness of 0.2 μm comprising ITO was formed on a Pyrex glass support having a thickness of 4.5 mm by a sputtering method, and further a $TiO_2$ film having a thickness of 0.8 μm was formed by a sol-gel method. The formation of the $TiO_2$ film was conducted by coating an aqueous dispersion of $TiO_2$ on the ITO film by a spin coating method (rotation rate: 1,400 rpm). Thereafter, as a reducing treatment, the substrate was annealed in a pure nitrogen gas added with 4% of a hydrogen gas was conducted at 360° C. for 20 minutes in the same manner as in Example 1.

The thus produced electrodeposition substrate was installed in an apparatus having the three-electrode arrangement generally employed in the field of electrochemistry shown in FIG. 12.

The electrodeposition substrate was arranged in such a manner that the $TiO_2$ layer of the substrate was immersed in a nickel plating solution (Ni ion concentration: 2.3%) containing nickel sulfate having a liquid temperature of 50° C., and the substrate was irradiated from the back surface of the substrate with a mercury-xenon vapor lamp (produced by Yamashita Denso Corp., wavelength: 365 nm, light intensity: 50 mw/cm$^2$) with applying a bias voltage of 1.9 V to the conductive film of the electrodeposition substrate. A plating electric current was applied for 5 seconds to form a black matrix layer comprising a nickel plating film having a thickness of 0.20 μm on a surface, at which a photoelectric current was not generated. The optical transmission density of the black matrix film was 2.9.

Thereafter, a colored electrodeposition film was formed by using the same apparatus as above.

As an electrodeposition solution for forming a red filter, an aqueous dispersion (solids content concentration: 8.6% by weight, pH: 7.8) containing a styrene-acrylic acid random copolymer (the number average molecular weight: 10,000, styrene content: 68% by mol, acid value: 160, glass transition point: 35° C., flow initiating point: 85° C., decomposition point: 240° C., deposition initiating pH: 5.8) and an azo series super-fine particulated red pigment at a solids content ratio of 9/1 was used.

A voltage was applied to the ITO conductive film in such a manner that a bias potential difference of +1.7 V was formed on the photosemiconductor thin film ($TiO_2$ film) with respect to the saturated calomel electrode. The electrodeposition substrate was irradiated from the back surface of the substrate with a mercury-xenon vapor lamp (produced by Yamashita Denso Corp., wavelength: 365 nm, light intensity: 50 mW/cm$^2$) for 5 seconds through a photomask for the red filter, to form a red mask filter pattern only on the region of the surface of the $TiO_2$ film that was irradiated with light. Thereafter, the pattern image was washed by immersing in a pH adjusting liquid having a pH value of 4.2.

A green mask filter pattern was formed only on a region of the $TiO_2$ film irradiated with light in the same manner as in the formation of the red filter except that an aqueous dispersion (solids content concentration: 8.1% by weight, pH: 7.8) containing the same styrene-acrylic acid copolymer as the electrodeposition polymer and a phthalocyanine green series super-fine particulated pigment at a solids content ratio of 9/1 was used as an electrodeposition solution for forming a green filter, and the substrate was irradiated with light for 5 second through a photomask for the green filter. Thereafter, the substrate was washed with apH adjusting liquid having apH value of 4.2.

A blue mask filter pattern was formed only on a region of the $TiO_2$ film irradiated with light in the same manner as in the formation of the red filter except that an aqueous dispersion (solids content concentration: 8.5% by weight, pH: 7.8) containing the same styrene-acrylic acid copolymer as the electrodeposition polymer and a phthalocyanine blue series super-fine particulated pigment at a solids content ratio of 9/1 was used as an electrodeposition solution for forming a blue filter, and the substrate was irradiated with light for 5 second through a photomask for the blue filter.

At the boundary part of the filter layer, the boundary was optically clearly found but leakage of light was not found, and thus an excellent performance had been confirmed. After washing with a pH adjusting liquid having a pH value of 4.2, a polyimide film having a thickness of 0.2 mm was put on the surface of the electrodeposition layer, and the resulting test piece was immersed in pure water for 20 days. The characteristics of the film were then observed but no change was found, and thus it was confirmed that the color filter had a sufficient durability. The resulting product was used as a color filter.

EXAMPLE 4

A light transmissible conductive layer comprising ITO having a thickness of 0.3 μm was formed on a quartz glass support having a thickness of 3 mm by a sputtering method, and further laminated thereon with an a-Si film and then with a p-type a-Si film having a thickness of 0.1 μm as a photoelectromotive layer by a glow discharge film formation method of a silane gas with a diborane gas being introduced within a later half of the film formation. Thereafter, a heat treatment was conducted by irradiating with laser light to a surface temperature of about 550° C. to increase the crystallinity of the Si film, so as to form a pn junction type poly-Si film. The thus produced electrodeposition substrate was installed in an apparatus having the three-electrode arrangement generally employed in the field of electrochemistry shown in FIG. 12.

As an electrodeposition solution for forming a red filter, a weakly alkaline aqueous dispersion (solids content concentration: 8.7% by weight, pH: 7.8) containing the same electrodeposition polymer and the same azo series super-fine particulated red pigment as in Example 1 at a solids content ratio of 7/3 was used.

A voltage was applied to the ITO conductive film in such a manner that a bias potential difference of +1.7 V was formed on the photosemiconductor thin film (Si film) with respect to the saturated calomel electrode. The electrodeposition substrate was irradiated from the back surface with laser light of a signal corresponding to a red filter pixel by using an He-Ne laser light source to form a red mask filter pattern only on a region of the Si film, on which the laser light was irradiated. Thereafter, the pattern image was washed by immersing in a pH adjusting liquid having a pH value of 3.0.

A green mask filter pattern was formed only on a region of the Si film irradiated with laser light in the same manner as in the formation of the red filter except that an aqueous dispersion (solids content concentration: 9.5% by weight, pH: 7.8) containing the same electrodeposition polymer and the same phthalocyanine green series super-fine particulated pigment as in Example 1 at a solids content ratio of 7/3 was used as an electrodeposition solution for forming a green filter, and the substrate was irradiated with laser light of a signal corresponding to a green filter pixel by using an He-Ne laser light source to form a green mask filter pattern only on a region of the Si film, on which the laser light was irradiated. Thereafter, the pattern image was washed by immersing in a pH adjusting liquid having a pH value of 3.0.

A blue mask filter pattern was formed only on a region of the Si film irradiated with laser light in the same manner as in the formation of the red filter except that an aqueous dispersion (solids content concentration: 8.1% by weight, pH: 7.8) containing the same electrodeposition polymer and the same phthalocyanine blue series super-fine particulated pigment as in Example 1 at a solids content ratio of 7/3 was used as an electrodeposition solution for forming a blue filter, and the substrate was irradiated with laser light of a signal corresponding to a blue filter pixel by using an He-Ne laser light source to form a blue mask filter pattern only on a region of the Si film, on which the laser light was irradiated. Thereafter, the pattern image was washed by immersing in a pH adjusting liquid having a pH value of 3.2. The electrodeposition substrate was arranged in such a manner that the Si layer having the colored electrodeposition film thereon was immersed in a nickel plating solution containing nickel sulfate (Ni ion concentration: 12.3%) having a liquid temperature of 20° C., and a bias voltage of −2.1 V was applied to the conductive film of the electrodeposition substrate for 6.5 seconds to generate a plating voltage on the part other than the colored filter to form a black matrix pattern image comprising an Ni plating film having a thickness of 0.2 $\mu$m. The black matrix was formed only on a part other than the color filter and had an optical transmission density of 3.2.

A silicone resin layer as a protective layer having a thickness of 50 Å was coated on the surface on which the colored electrodeposition films and the black matrix were formed, by plasma polymerization, so as to form a color filter.

Because the filter part is formed by the photoelectrodeposition method and the black matrix is formed by metallic plating, the invention can provide a process for producing a color filter using no photolithography process with a small number of steps and a low cost. According to the production process of the invention, the edge part of the filter part and the black matrix part exhibits a clear boundary without leakage of light, and a color filter that is high in resolution, controllability and light transmissibility can be obtained.

EXAMPLE 5

A transparent conductive layer comprising ITO having a thickness of 0.1 $\mu$m was formed on a quartz glass substrate having a thickness of 1.5 mm by a sputtering method, and further a $TiO_2$ film having a thickness of 0.5 $\mu$m was formed. In order to increase the photoelectric current characteristics of the $TiO_2$ thin film, a reducing treatment was conducted in a mixed gas of hydrogen and nitrogen was conducted. The reducing treatment was conducted by annealing in a pure nitrogen gas added with 4% of a hydrogen gas at 460° C. for 10 minutes. The $TiO_2$ thin film thus produced had a volume resistivity of $5 \times 10^4$ $\Omega \cdot cm$.

The thus produced electrodeposition substrate was installed in an apparatus having the three-electrode arrangement generally employed in the field of electrochemistry shown in FIG. 12. An aqueous electrolytic solution used was an aqueous solution comprising an electrodeposition polymer material (a styrene-acrylic acid random copolymer, the number average molecular weight: 19,000, molar ratio of hydrophobic group/ (hydrophilic group+hydrophobic group): 73%, acid value: 90, glass transition point: 45° C., flow initiating point: 90° C., decomposition point: 247° C., deposition initiating pH: 5.8) and an azo series super-fine particulated red pigment dispersed therein at a solids content ratio of 5/5. The aqueous solution had a volume resistivity of $3 \times 10^2 \Omega \cdot cm$.

In the aqueous electrolytic solution, a bias voltage of 1.7 V was applied to the $TiO_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 3 seconds through a photomask of a mask pattern image, to form a red mask filter pattern on a region of the surface of the $TiO_2$ thin film irradiated with the transmitted light.

In an aqueous solution (volume resistivity: $2.5 \times 10^2$ $\Omega \cdot cm$) comprising the styrene-acrylic acid random copolymer as the polymer material and a phthalocyanine green series super-fine particulated pigment dispersed therein at a solids content ratio of 5/5, a voltage of 1.7 V was applied to the $TiO_2$ electrode used as the working electrode with respect to the saturated calomel electrode, and the substrate was irradiated from the back surface with a mercury-xenon vapor lamp (produced by Yamashita Denso Corp., wavelength: 365 nm, light intensity: 50 mW/cm$^2$) for 4 seconds through a photomask. A green mask filter pattern was formed only on a region of the surface of the $TiO_2$ thin film irradiated with light. Thereafter, cascade washing with a pH adjusting liquid having a pH value of 4.5 was sufficiently conducted. Similarly, in an aqueous solution (volume resistivity: $2.8 \times 10^2$ $\Omega \cdot cm$) comprising the styrene-acrylic acid random copolymer as the polymer material and a phthalocyanine blue series super-fine particulated pigment dispersed therein at a solids content ratio of 5/5, a voltage of 1.8 V was applied to the $TiO_2$ electrode used as the working electrode with respect to the saturated calomel electrode, and the substrate was irradiated with light. A blue mask filter pattern was formed only on a region of the surface of the $TiO_2$ thin film irradiated with light. Thus, a color filter layer of three primary colors was formed.

In an aqueous dispersion comprising the styrene-acrylic acid random copolymer as the polymer material and a carbon black super-fine particulated pigment dispersed therein at a solids content ratio of 2/8, a voltage of 1.5 V was applied to the $TiO_2$ electrode used as the working electrode with respect to the saturated calomel electrode, and the whole surface of the substrate was irradiated from the back surface with a mercury-xenon vapor lamp (produced by Yamashita Denso Corp., wavelength: 365 nm, light intensity: 50 mW/cm$^2$) for 4 seconds. A black pattern was formed only on a region of the surface of the $TiO_2$ thin film, on which the color filter layer was not formed. Thereafter, cascade washing with a pH adjusting liquid having a pH value of 4.5 was sufficiently conducted. After the substrate was then washed with a pH adjusting liquid having a pH value of 4.6, the whole of the substrate was immersed in an Ni plating solution mainly comprising nickel sulfate having a pH value of 4.3, and a bias voltage was applied to the substrate. A nickel plating film was deposited on the part of the black electrodeposition film constituting the black pattern to form a nickel plating thin film having a thickness of 0.2 $\mu$m. Thus, a multi-layer black matrix comprising the black electrodeposition film and the metallic plating thin film was formed. The black matrix had a layer thickness of 800 nm. The multi-layer black matrix film had an optical transmission density of 3.5.

A protective layer was then further coated thereon to form a color filter.

The resulting color filter had a boundary part that was optically clearly distinguished with no leakage of light at the boundary part, and thus had excellent optical characteristics. As a result of the evaluation of the optical characteristics of the boundary between the filter part and the black matrix part of the color filter thus produced, the deviation of the edge part of the boundary was within 1.2 $\mu$m, and it was confirmed that the color filter was of high precision. After the color filter was immersed in pure water for 20 days, the characteristics of the film were then observed but no change was found, and thus it was confirmed that the color filter had a sufficient durability.

EXAMPLE 6

A transparent conductive layer comprising ITO having a thickness of 0.2 $\mu$m was formed on a non-alkali glass substrate having a thickness of 1.2 mm by a sputtering method, and further a TiO$_2$ film having a thickness of 0.4 µm was formed by a sputtering method. In order to increase the photoelectric current characteristics of the TiO$_2$ thin film, a reducing treatment was conducted by annealing in a pure nitrogen gas added with 5% of a hydrogen gas at 420° C. for 20 minutes. The TiO$_2$ thin film thus produced had a volume resistivity of 4×10$^4$ Ω·cm.

The thus produced electrodeposition substrate was installed in an apparatus having the three-electrode arrangement generally employed in the field of electrochemistry shown in FIG. 12. An aqueous electrolytic solution used was an aqueous solution comprising an electrodeposition polymer material (a styrene-acrylic acid random copolymer, the number average molecular weight: 22,000, molar ratio of hydrophobic group/ (hydrophilic group+hydrophobic group) : 70%, acid value: 100, glass transition point: 55° C., flow initiating point: 94 ° C., decomposition point: 254° C., deposition initiating pH: 5.9) and a carbon black super-fine particulated pigment dispersed therein at a solids content ratio of 1/9.

In the aqueous electrolytic solution, a voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 2 seconds through a photomask, to form a black pattern on a region of the surface of the TiO$_2$ thin film irradiated with light. The whole substrate was immersed in a tin chloride plating solution having a liquid temperature of 30° C., the pH value of which was adjusted to 3.6, and the substrate was exposed from the back surface in the form of a image pattern of the black matrix with applying an opposite voltage, to generate a plating electric current for 15 minutes, so that a tin plating film having a thickness of 0.12 µm was formed on the electrodeposition polymer film of carbon black. Thus, a thin and uniform black matrix layer having a smooth surface was formed. The black matrix layer had a thickness of 0.7 µm and an optical transmission density of 3.6.

The substrate having the black matrix layer was installed in an apparatus having the three-electrode arrangement generally employed in the field of electrochemistry shown in FIG. 12. An aqueous electrolytic solution used was an aqueous solution (volume resistivity: 3.2×10$^2$ Ω·cm) comprising a styrene-acrylic acid random copolymer (the number average molecular weight: 14,000, molar ratio of hydrophobic group/ (hydrophilic group+hydrophobic group): 73%, acid value: 89, glass transition point: 42° C., flow initiating point: 97° C., decomposition point: 238° C., deposition initiating pH: 6.3) and an azo series super-fine particulated red pigment dispersed therein at a solids content ratio of 6/4. In the aqueous electrolytic solution, a voltage of 1.8 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 6 seconds through a photomask for red, to form a red mask filter pattern on a region of the surface of the TiO$_2$ thin film irradiated with the light.

Thereafter, the substrate was washed with a pH adjusting liquid having a pH value of 4.8. In an aqueous solution (volume resistivity: 3.5×10$^2$ Ω·cm) comprising the polymer material and a phthalocyanine series green super-fine particulated pigment dispersed therein at a solids content ratio of 6/4, a voltage of 1.8 V was applied to the TiO$_2$ electrode used as the working electrode with respect to the saturated calomel electrode, and the substrate was irradiated from the back surface with a mercury-xenon vapor lamp (produced by Yamashita Denso Corp., wavelength: 365 nm, light intensity: 50 mW/cm$^2$) for 7 seconds through a photomask for green, to form a green mask filter pattern only on a region of the surface of the TiO$_2$ thin film irradiated with light. Thereafter, the substrate was washed with a pH adjusting liquid having a pH value of 4.7. Similarly, in an aqueous solution (volume resistivity: 3.1×10$^2$ Ω·cm) comprising the polymer material and a phthalocyanine series blue super-fine particulated pigment dispersed therein at a solids content ratio of 6/4, a voltage of 1.9 V was applied to the TiO$_2$ electrode used as the working electrode with respect to the saturated calomel electrode, and the substrate was irradiated from the back surface with a mercury-xenon vapor lamp (produced by Yamashita Denso Corp., wavelength: 365 nm, light intensity: 50 mW/cm$^2$) for 7 seconds through a photomask for blue, to form a blue mask filter pattern only on a region of the surface of the TiO$_2$ thin film irradiated with light. Thus, a color filter layer of three primary colors was thus formed.

The substrate was then washed with a pH adjusting liquid having a pH value of 4.2, and a protective layer was then further coated thereon to form a color filter.

The resulting color filter had a boundary part that was optically clearly distinguished with no leakage of light at the boundary part, and thus had excellent optical characteristics. As a result of the evaluation of the optical characteristics of the boundary between the filter part and the black matrix part of the color filter thus produced, the deviation of the edge part of the boundary was within 2.1 µm, and it was confirmed that the color filter was of high precision. After the color filter was immersed in pure water for 20 days, the characteristics of the film were then observed but no change was found, and thus it was confirmed that the color filter had a sufficient durability.

EXAMPLE 7

A transparent conductive layer comprising ITO having a thickness of 0.16 µm was formed on a Pyrex glass substrate having a thickness of 5 mm by a sputtering method, and further a TiO$_2$ layer having a thickness of 0.8 µm was formed on the ITO thin film by a sol-gel method. The film formation of the TiO$_2$ layer was conducted by a spin coating method using an alkoxide of TiO$_2$ with a rotation rate of 1,400 rpm. Thereafter, the coated film was subjected to a heat treatment at about 500° C. for 1 hours to form a TiO$_2$ film. The TiO$_2$ film was then further subjected to a reducing treatment by annealing in a pure nitrogen gas added with 4% of a hydrogen gas at 360° C. for 20 minutes as in Example 5, to obtain a substrate.

The thus produced substrate was washed with a pH adjusting liquid having a pH value of 4.2, and then installed in an apparatus having the three-electrode arrangement generally employed in the field of electrochemistry shown in FIG. 12. An aqueous electrolytic solution used was an aqueous solution comprising an electrodeposition polymer material (a styrene-acrylic acid random copolymer, the number average molecular weight: 13,000, molar ratio of hydrophobic group/ (hydrophilic group+hydrophobic group): 70%, acid value: 95, glass transition point: 46° C., flow initiating point: 90° C., decomposition point: 244° C., deposition initiating pH: 5.9) and a carbon black super-fine particulated pigment dispersed therein at a solids content ratio of 1/9.

In the aqueous electrolytic solution, a voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 2 seconds through a photomask, to form a black pattern on a region of the surface of the TiO$_2$ thin film irradiated with light. Cascade washing with a pH adjusting liquid having a pH value of 4.5 was the sufficiently conducted. The substrate was arranged in a nickel plating solution having a liquid temperature of 50° C., in such a manner that the TiO$_2$ surface was immersed in the plating solution, and the substrate was exposed from the back surface in the form of an image pattern of the black matrix with applying an opposite voltage, to generate a photoelectric current on the pattern wise irradiated surface, so that at in plating film having a thickness of 0.2 μm was formed on a part where the photoelectric current was not generated. Furthermore, the substrate having the black electrodeposition film and the metallic plating film was immersed in an aqueous dispersion comprising the styrene-acrylic acid random copolymer as the polymer material and a carbon black super-fine particulated pigment dispersed therein at a solids content ratio of 1/9, and a voltage of 1.7 V was applied to the TiO$_2$ electrode used as the working electrode with respect to the saturated calomel electrode. The whole surface of the substrate was irradiated from the back surface with a mercury-xenon vapor lamp (produced by Yamashita Denso Corp., wavelength: 365 nm, light intensity: 50 mW/cm$^2$) for 1 second through a photomask. A black pattern was formed only on a region of the surface of the TiO$_2$ thin film irradiated with light. Thereafter, cascade washing with a pH adjusting liquid having a pH value of 4.5 was sufficiently conducted. As a result, a black matrix comprising the black electrodeposition film, the metallic plating film and the black electrodeposition film was formed. The black matrix layer had a film thickness of 0.85 μm and an optical transmission density of 3.9.

The substrate having the black matrix layer was installed in an apparatus having the three-electrode arrangement generally employed in the field of electrochemistry shown in FIG. 12. An aqueous electrolytic solution used was an aqueous solution (volume resistivity: 1.8×10$^2$ Ω·cm) comprising a styrene-acrylic acid random copolymer (molecular weight: 10,000, molar ratio of hydrophobic group/ (hydrophilic group+hydrophobic group): 68%, acid value: 160, glass transition point: 35° C., flow initiating point: 85° C., decomposition point: 240° C., deposition initiating pH: 5.8) and an azo series super-fine particulated red pigment dispersed therein at a solids content ratio of 8/2. In the aqueous electrolytic solution, a voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 5 seconds through a photomask for red, to form a red mask filter pattern on a region of the surface of the TiO$_2$ thin film irradiated with the light. Thereafter, the pattern image was washed by immersing in a pH adjusting liquid having a pH value of 4.2.

In an aqueous solution (volume resistivity: 2.0×10$^2$ Ω·cm) comprising the electrodeposition polymer material and a phthalocyanine series green super-fine particulated pigment dispersed therein at a solids content ratio of 8/2, a voltage of 1.7 V was applied to the TiO$_2$ electrode used as the working electrode with respect to the saturated calomel electrode, and the substrate was irradiated from the back surface with a mercury-xenon vapor lamp (produced by Yamashita Denso Corp., wavelength: 365 nm, light intensity: 50 mW/cm$^2$) for 5 seconds through a photomask for green, to form a green mask filter pattern only on a region of the surface of the TiO$_2$ thin film irradiated with light. Thereafter, the substrate was washed with a pH adjusting liquid having a pH value of 4.6. Similarly, in an aqueous solution (volume resistivity: 2.1× 10$^2$ Ω·cm) comprising the electrodeposition polymer material and a phthalocyanine series blue super-fine particulated pigment dispersed therein at a solids content ratio of 8/2, a voltage of 1.7 V was applied to the TiO$_2$ electrode used as the working electrode with respect to the saturated calomel electrode, and the substrate was irradiated from the back surface with a mercury-xenon vapor lamp (produced by Yamashita Denso Corp., wavelength: 365 nm, light intensity: 50 mW/cm$^2$) for 5 seconds through a photomask for blue, to form a blue mask filter pattern only on a region of the surface of the TiO$_2$ thin film irradiated with light. Thus, a color filter layer of three primary colors was thus formed. The substrate was then washed with a pH adjusting liquid having a pH value of 4.5 and dried, and a polyimide film having a thickness of 0.2 mm was transferred to the surface of the electrodeposition layer with heat to form a color filter.

The resulting color filter had a boundary part that was optically clearly distinguished with no leakage of light at the boundary part, and thus had excellent optical characteristics. As a result of the evaluation of the optical characteristics of the boundary between the filter part and the black matrix part of the color filter thus produced, the deviation of the edge part of the boundary was within 2.8 μm, and it was confirmed that the color filter was of high precision. After the color filter was immersed in pure water for 20 days, the characteristics of the film were then observed but no change was found, and thus it was confirmed that the color filter had a sufficient durability.

EXAMPLE 8

A transparent conductive layer comprising ITO having a thickness of 0.3 μm was formed on a quartz glass substrate having a thickness of 3 mm by a sputtering method, and further laminated thereon with an a-Si film and then with a p-type a-Si film having a thickness of 0.1 μm as a photo-electromotive layer by a glow discharge film formation method of a silane gas with a diborane gas being introduced within a later half of the film formation. Thereafter, a heat treatment was conducted by irradiating with laser light to a surface temperature of about 550° C. to increase the crystallinity of the Si film, so as to form a pn junction type poly-Si film.

The substrate was installed in an apparatus having the three-electrode arrangement generally employed in the field of electrochemistry shown in FIG. 12. An aqueous electrolytic solution used was an aqueous solution (volume resistivity: 2.1×10$^2$ Ω·cm) comprising the same electrodeposition polymer material and the same azo series super-fine particulated red pigment as in Example 6 dispersed therein at a solids content ratio of 7/3. In the aqueous electrolytic solution, a voltage of 1.7 V was applied to the Si layer electrode used as a working electrode with respect to a saturated calomel electrode, and the substrate was irradiated from the back surface with laser light of a signal corresponding to a red filter pixel by using an He—Ne laser light source to form a red mask filter pattern only on a region of the Si layer, on which the laser light was irradiated. Thereafter, the pattern image was washed by immersing in a pH adjusting liquid having a pH value of 5.0.

In an aqueous solution (volume resistivity: $2.5 \times 10^2$ Ω·cm) comprising the electrodeposition polymer material and a phthalocyanine series green super-fine particulated pigment dispersed therein at a solids content ratio of 7/3, a voltage of 1.7 V was applied to the Si electrode used as the working electrode with respect to the saturated calomel electrode, and the substrate was irradiated from the back surface with He-Ne laser light as similar to the above. A green mask filter pattern was formed only on a region of the surface of the Si film irradiated with light. Thereafter, the pattern image was washed by immersing in a pH adjusting liquid having a pH value of 5.0. Similarly, in an aqueous solution (volume resistivity: $2.4 \times 10^2$ Ω·cm) comprising the electrodeposition polymer material and a phthalocyanine series blue super-fine particulated pigment dispersed therein at a solids content ratio of 7/3, a voltage of 1.7 V was applied to the Si electrode used as the working electrode with respect to the saturated calomel electrode, and the substrate was irradiated with the laser light as similar to the above. A blue mask filter pattern was formed only on a region of the surface of the Si film irradiated with light. Thus, a color filter layer of three primary colors was formed.

The substrate having the color filter layer was washed by immersing in a pH adjusting liquid having a pH value of 3.2. After washing the substrate with a pH adjusting liquid having a pH value of 4.2, the substrate was arranged in such a manner that the surface of the Si film was immersed in a nickel plating solution, having a liquid temperature of 20° C., and an opposite bias voltage was applied to the substrate to generate a plating voltage on the part other than the part on which the filter was electrodeposited, to form a metallic plating thin film. Thereafter, the substrate was installed in an apparatus having the three-electrode arrangement generally employed in the field of electrochemistry shown in FIG. 12. An aqueous electrolytic solution used was an aqueous solution comprising an electrodeposition polymer material (a styrene-acrylic acid random copolymer, the number average molecular weight: 22,000, molar ratio of hydrophobic group/(hydrophilic group+hydrophobic group) : 70%, acid value: 100, glass transition point: 55° C., flow initiating point: 94° C., decomposition point: 254° C., deposition initiating pH: 5.9) and a carbon black super-fine particulated pigment dispersed therein at a solids content ratio of 1/9. A voltage of 1.7 V was applied to the Si electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 2 seconds through a photomask, to form a black pattern on a region of the surface of the Si film irradiated with light. Thus, a black matrix layer comprising the metallic plating thin film and the black electrodeposition film was formed. The black matrix layer had a thickness of 0.2 μm and an optical transmission density of 3.2.

Thereafter, a protective layer comprising polyimide was coated thereon to complete the color filter. The resulting color filter had a boundary part that was optically clearly distinguished with no leakage of light at the boundary part, and thus had excellent optical characteristics. After the color filter was immersed in pure water for 20 days, the characteristics of the film were then observed but no change was found, and thus it was confirmed that the color filter had a sufficient durability.

According to the invention, a color filter having a high resolution and a high light transmissibility with substantially no reflection of external light can be provided without using a photolithography technique. Furthermore, a color filter having a clear boundary of the edge part between the color filter layer and the black matrix layer and having substantially no light reflectivity can be provided.

EXAMPLE 9

A transparent conductive layer comprising ITO having a thickness of 0.23 μm was formed on a quartz glass substrate having a thickness of 0.8 mm by a sputtering method, and further a TiO$_2$ film having a thickness of 0.4 μm was formed. In order to increase the photoelectric current characteristics of the TiO$_2$, the substrate was subjected to a reducing treatment in a mixed gas of hydrogen and nitrogen. The reducing treatment was conducted by annealing in a pure nitrogen gas added with 4% of a hydrogen gas at 440° C. for 40 minutes, to obtain a transparent substrate.

(Formation of Filter Part)

An image recording was conducted with the transparent substrate using an image recording apparatus shown in FIG. 12. The image recording apparatus had such a configuration, as shown in FIG. 12, in that an image retaining member 18 having a working electrode for input of an image signal from the back surface was placed in an electrodeposition bath 20 containing an electrodeposition solution 22 described below in such a manner that the back surface thereof was outside the solution, and a control electrode 15 utilizing a counter electrode 26 and a salt bridge 23 was provided inside the bath. By using the three-electrode arrangement generally employed in the field of electrochemistry, in an aqueous electrodeposition solution comprising an electrodeposition polymer material (a styrene-acrylic acid random copolymer, the number average molecular weight: 19,000, molar ratio of hydrophobic group/ (hydrophilic group+hydrophobic group) : 73%, acid value: 90, glass transition point: 45° C., flow initiating point: 90° C., decomposition point: 247° C., deposition initiating pH: 5.8) and an azo series super-fine particulated red pigment dispersed therein at a solids content ratio of 5/5, a bias voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 2.5 seconds through a photomask of a mask pattern image, to form a red mask filter pattern on a region of the surface of the TiO$_2$ film irradiated with the light.

Similarly, in an aqueous electrodeposition solution comprising the styrene-acrylic acid random copolymer as the polymer material and a phthalocyanine series green super-fine particulated pigment dispersed therein at a solids content ratio of 5/5, a voltage of 1.8 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 4 seconds through a photomask, to form a green mask filter pattern on a region of the surface of the TiO$_2$ film irradiated with the light. Thereafter, cascade washing with a pH adjusting liquid having a pH value of 4.2 was sufficiently conducted.

Similarly, in an aqueous electrodeposition solution comprising the styrene-acrylic acid random copolymer as the polymer material and a phthalocyanine series blue super-fine particulated pigment dispersed therein at a solids content ratio of 5/5, a voltage of 1.9 V was applied to the TiO$_2$ electrode used as a working electrode with respect to a saturated calomel electrode, and the substrate was irradiated from the back surface, to form a blue mask filter pattern on a region of the surface of the TiO$_2$ film irradiated with the transmitted light, so that a color filter layer was formed.
(Formation of Black Matrix)

The substrate was washed with a pH adjusting liquid having a pH value of 4.6, and was immersed in a liquid formed in such a manner that 8% by weight, based on the total amount of the liquid, of carbon black pigment particles having an average particle diameter of 13 nm were added to an Ni plating solution having a pH value of 4.3 mainly comprising nickel sulfate, followed by mixing and dispersing by propeller stirring. A bias voltage of −5.0 V was applied to the substrate to conduct a formation process of a metallic plating film having the black pigment particles dispersed therein on the conductive part of the region, on which the color filter was not formed, so that a nickel plating film having a thickness of 0.26 μm having carbon black particles dispersed therein was formed. A black matrix was formed with the thin film. The composite black matrix film at this time had an optical transmission density of 3.1. A protective layer was coated thereon to form a color filter.

As a result of the evaluation of the optical characteristics of the boundary between the filter part and the black matrix part of the color filter thus produced, the deviation of the edge part of the boundary was within 3.6 μm, and it was confirmed that the color filter was of high precision.

EXAMPLE 10

A transparent conductive layer comprising ITO having a thickness of 0.3 μm was formed on a non-alkali glass substrate (7095) having a thickness of 0.9 mm by a sputtering method, and further a TiO$_2$ film having a thickness of 0.4 μm was formed by a sputtering method. In order to increase the photoelectric current characteristics of the TiO$_2$, the substrate was subjected to a reducing treatment by annealing in a pure nitrogen gas added with 5% of a hydrogen gas at 450° C. for 25 minutes. Thereafter, cascade washing with a pH adjusting liquid having a pH value of 4.5 was sufficiently conducted.
(Formation of Black Matrix)

The substrate was immersed in a liquid formed in such a manner that 12% by weight, based on the total amount of the liquid, of carbon black pigment particles having an average particle diameter of 23 nm were added to a tin chloride plating solution having a pH value of 3.6 and a liquid temperature of 30° C., followed by subjecting forced mixing. An opposite voltage of −1.6 V was applied to the whole substrate from the back surface with irradiation of a negative/positive inverted image pattern by light, to from an image pattern of a black matrix on a part not irradiated with light. The period of time of application of electricity and exposure was 35 seconds. The resulting plating film was a tin complex plating film having the carbon black pigment particles dispersed therein in a thickness of 0.22 μm. Accordingly, a uniform and thin black matrix layer having a smooth surface was formed. The black matrix film had an optical transmission density of 3.1.
(Formation of Filter Part)

By using the three-electrode arrangement generally employed in the field of electrochemistry, in an aqueous solution containing a pigment comprising a styrene-acrylic acid random copolymer (molecular weight: 14,000, the molar ratio of hydrophobic group/(hydrophilic group+ hydrophobic group): 73%, acid value: 96, glass transition point: 47° C., flow initiating point: 92° C., decomposition point: 248° C., deposition initiating pH: 5.9) and an azo series super-fine particulated red pigment dispersed therein at a solids content ratio of 6/4, a voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 6 seconds through a photomask for red, to form a red mask filter pattern on a region of the surface of the TiO$_2$ film irradiated with the light. The substrate was then washed with a pH adjusting liquid having a pH value of 4.3.

Thereafter, in an aqueous solution containing a pigment comprising the same electrodeposition polymer material as above and a phthalocyanine series green super-fine particulated pigment dispersed therein at a solids content ratio of 6/4, a voltage of 1.7 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 9 seconds through a photomask for green, to form a green mask filter pattern on a region of the surface of the TiO$_2$ film irradiated with the light. Thereafter, the substrate was washed with a pH adjusting liquid having a pH value of 4.3.

Similarly, in an aqueous solution containing a pigment comprising the same electrodeposition polymer material as above and a phthalocyanine series blue super-fine particulated pigment dispersed therein at a solids content ratio of 6/4, a voltage of 1.8 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 9 seconds through a photomask for blue, to form a blue mask filter pattern on a region of the surface of the TiO$_2$ film irradiated with the light. Thereafter, the substrate was washed with a pH adjusting liquid having a pH value of 4.6. A protective layer was coated thereon to form a color filter.

EXAMPLE 11

A transparent conductive film comprising ITO having a thickness of 0.3 μm was formed on a Pyrex glass substrate having a thickness of 3 mm by a sputtering method, and further a TiO$_2$ film having a thickness of 0.5 μm was formed on the ITO thin film by a sol-gel method. The film formation was conducted by a spin coating method at a rotation rate of 1,600 rpm by using an alkoxide of TiO$_2$ to form a TiO$_2$ layer. Thereafter, the layer was subjected to a heat treatment at about 500° C. for 1 hour to form a TiO$_2$ film. The substrate was then subjected to a reducing treatment by annealing in a pure nitrogen gas added with 4% of a hydrogen gas at 360° C. for 20 minutes as similar to Example 9.
(Formation of Filter Part)

By using the three-electrode arrangement generally employed in the field of electrochemistry, in an aqueous solution containing a pigment comprising an electrodeposition polymer material, i.e., a styrene-acrylic acid random copolymer (the number average molecular weight: 14,000, molar ratio of hydrophobic group/ (hydrophilic group+ hydrophobic group): 69%, acid value: 100, glass transition point: 35° C., flow initiating point: 85° C., decomposition point: 240° C., deposition initiating pH: 5.8), and an azo series super-fine particulated red pigment dispersed therein at a solids content ratio of 8/2, a bias voltage of 1.7 V was applied to the TiO$_2$ electrode used as a working electrode with respect to a saturated calomel electrode, and the substrate was irradiated from the back surface with a pattern image by a mercury-xenon vapor lamp (produced by Yamashita Denso Corp., wavelength: 365 nm, light intensity: 50 mW/cm$^2$) for 7 seconds through a photomask, to form a mask filter pattern of a red part on a region of the surface of the TiO$_2$ film irradiated with the light. The substrate was then washed with a pH adjusting liquid having a pH value of 4.0.

Thereafter, in an aqueous dispersion comprising the electrodeposition polymer material and a phthalocyanine series green super-fine particulated pigment dispersed therein at a solids content ratio of 8/2, a voltage of 1.8 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 8 seconds through a photomask for green, to form a green mask filter pattern on a region of the surface of the TiO$_2$ film irradiated with the light. The substrate was then washed with a pH adjusting liquid having a pH value of 4.6.

Similarly, in an aqueous solution containing a pigment comprising the electrodeposition polymer material and a phthalocyanine series blue super-fine particulated pigment dispersed therein at a solids content ratio of 8/2, a voltage of 1.9 V was applied to the TiO$_2$ electrode used as a working electrode with respect to a saturated calomel electrode, and the substrate was irradiated from the back surface with a mercury-xenon vapor lamp (produced by Yamashita Denso Corp., wavelength: 365 nm, light intensity: 50 mW/cm$^2$) for 7 seconds through a photomask for blue, to form a blue mask filter pattern on a region of the surface of the TiO$_2$ film irradiated with the light, so that a color filter layer was formed.

(Formation of Black Matrix)

The substrate was immersed in a liquid formed in such a manner that 17% by weight, based on the total amount of the liquid, of carbon black pigment particles having an average particle diameter of 33 nm was added to an Ni plating solution having a pH value of 4.3 mainly comprising nickel sulfate, followed by mixing and dispersing by propeller stirring. A bias voltage of −0.8 V was applied to the substrate while the whole surface was irradiated with light for 108 seconds to conduct a formation process of a metallic plating film having the black pigment particles dispersed therein on the conductive part of the region, on which the color filter was not formed, so that a nickel plating film having a thickness of 0.26 µm having carbon black particles dispersed therein was formed. A black matrix was formed with the thin film.

The color filter thus obtained had an optically clear boundary at the boundary part between the filter layer and the black matrix layer with no leakage of light confirmed, and it had been confirmed that the color filter had an excellent performance. The color filter was then washed with a pHadjusting liquid having a pH value of 4.5 to complete the color filter.

After the color filter was immersed in pure water for 20 days, the characteristics of the film were then observed but no change was found, and thus it was confirmed that the color filter had a sufficient durability.

EXAMPLE 12

A transparent conductive film comprising ITO having a thickness of 0.4 µm was formed on a quartz glass substrate having a thickness of 1 mm by a sputtering method, and further a TiO$_2$ film having a thickness of 0.5 µm was formed on the ITO thin film by a sol-gel method. The film formation was conducted by a spin coating method at a rotation rate of 1,400 rpm by using an alkoxide of TiO$_2$ to form a TiO$_2$ layer. Thereafter, the layer was subjected to a heat treatment at about 500° C. for 1 hour to form a TiO$_2$ film. The substrate was then subjected to a reducing treatment by heating with laser light in a pure nitrogen gas added with 4% of a hydrogen gas as in Example 9, so as to increase the crystallinity of the TiO$_2$ film.

(Formation of Filter Part)

By using the three-electrode arrangement generally employed in the field of electrochemistry, in an aqueous pigment dispersion formed by dispersing an azo series super-fine particulated red pigment in a weakly alkaline aqueous solution comprising the same electrodeposition polymer material as in Example 9 at a solids content ratio of 7/3, a voltage of 1.7 V was applied to the TiO$_2$ electrode used as a working electrode with respect to a saturated calomel electrode, and the substrate was irradiated from the back surface with light corresponding a red filter pixel by using an ultraviolet light source, to form a red filter pattern on a region of the surface of the TiO$_2$ film irradiated with the light. The pattern image was then washed by immersing in a pH adjusting aqueous solution having a pH value of 5.0.

Thereafter, in an aqueous pigment dispersion comprising the electrodeposition polymer material and a phthalocyanine series green super-fine particulated pigment dispersed therein at a solids content ratio of 7/3, a voltage of 1.7 V was applied to the TiO$_2$ electrode used as a working electrode with respect to a saturated calomel electrode, and the substrate was irradiated from the back surface with a UV light as similar to the above, to form a green mask filter pattern on a region of the surface of the TiO$_2$ film irradiated with the light. The pattern image was then washed by immersing in a pH adjusting aqueous solution having a pH value of 4.0. Similarly, in an aqueous pigment dispersion comprising the electrodeposition polymer material and a phthalocyanine series blue super-fine particulated pigment dispersed therein at a solids content ratio of 7/3, a voltage of 1.7 V was applied to the TiO$_2$ electrode used as a working electrode with respect to a saturated calomel electrode, and the substrate was irradiated from the back surface with a UV light as similar to the above, to form a blue mask filter pattern on a region of the surface of the TiO$_2$ film irradiated with the light, so that a color filter layer was formed. The pattern image was then washed by immersing in a pH adjusting aqueous solution having a pH value of 4.2.

(Formation of Black Matrix)

The whole substrate was immersed in a nickel plating solution at 40° C. formed in such a manner that 2% by weight, based on the total liquid, of a phthalocyanine pigment having an average particle diameter of 52 nm and 9% by weight, based on the total liquid, of a carbon black pigment having an average particle diameter of 22 nm were added to an Ni plating solution having a pH value of 4.3 mainly comprising nickel sulfate, followed by subjecting to forced stirring. A bias voltage of 4.2 V was applied to the substrate for 23 seconds to conduct a formation process of a metallic plating film having the pigment particles dispersed therein on the conductive part of the region, on which the color filter was not formed, so that a nickel plating film having a thickness of 0.36 µm having coloring material particles dispersed therein was formed. A black matrix was formed with the thin film. This film had an optical transmission density of 3.1. Thereafter, a polyimide protective layer was coated thereon to complete a color filter.

According to the production process of the invention, an excellent filter having a good film quality comprising a filter part with a high resolution and a high controllability and light transmissibility, and a black matrix part excellent in uniformity and light shielding property with less unnecessary light reflection can be produced with a small number of steps and a low cost.

What is claimed is:

1. A process for producing a filter comprising:
   a step of arranging an electrodeposition substrate, which comprises a light transmissible support having a light transmissible conductive film and a photosemiconductor thin film with a photoelectromotive function in this order provided thereon, in such a manner that at least said photosemiconductor thin film is immersed in an electrodeposition solution containing a colored electrodeposition material;
   a step of imagewise exposing said electrodeposition substrate with applying a voltage or an electric current to said conductive film, to form a colored electrodeposition film in an exposed part;
   a step of immersing at least said photosemiconductor thin film, on which said colored electrodeposition film has been formed, of said electrodeposition substrate in a metallic plating solution; and
   a step of applying a voltage or an electric current to said conductive film, to form a black matrix comprising a metallic plating film in a part of said photosemiconductor thin film, in which s aid colored electrodeposition film is not formed.

2. A process for producing a filter as claimed in claim 1, wherein said photosemiconductor thin film is a compound photosemiconductor thin film containing titanium oxide.

3. A process for producing a filter as claimed in claim 1, wherein said photosemiconductor thin film has a volume resistivity of $10^5$ Ω·cm or less.

4. A process for producing a filter as claimed in claim 1, wherein said metallic plating film has a thickness in a range of from 70 to 900 nm.

5. A process for producing a filter as claimed in claim 1, wherein said metallic plating film comprises a metal selected from the group consisting of Ni, Cr, Cu, Au, Ag, Mo, Sn, Zn and Co, or an alloy comprising two or more selected from said group.

6. A process for producing a filter as claimed in claim 1, wherein said colored electrodeposition material contains a substance, a solubility or a dispersibility of which to said electrodeposition solution is changed with change of pH.

7. A process for producing a filter as claimed in claim 6, wherein said substance is a polymer containing a hydrophobic group and a hydrophilic group, a number of said hydrophobic group to a total number of said hydrophilic group and said hydrophobic group is from 40 to 80%.

8. A process for producing a filter as claimed in claim 7, wherein said polymer is a random copolymer of a monomer containing a hydrophobic group and a monomer containing a hydrophilic group.

9. A process for producing a filter as claimed in claim 7, wherein 50% or more in terms of number of said hydrophilic group is one reversibly converted to a hydrophobic group by change of pH.

10. A process for producing a filter as claimed in claim 6, wherein said substance is a polymer having a number average molecular weight from 6,000 to 25,000.

11. A process for producing a filter as claimed in claim 6, wherein said substance is a polymer having an acid value from 60 to 300.

12. A process for producing a filter as claimed in claim 1, wherein said colored electrodeposition material contains an electrodeposition polymer having a carboxyl group, and a pigment.

13. A process for producing a filter as claimed in claim 1, wherein in said step of forming said colored electrodeposition film, a voltage is applied to said conductive film in such a manner that said photosemiconductor thin film becomes an anode; and in said step of forming said black matrix, a voltage is applied to said conductive film in such a manner that said photosemiconductor thin film becomes a cathode.

14. A filter produced by a process as claimed in claim 1.

15. A process for producing a filter comprising:
   a step of arranging an electrodeposition substrate, which comprises a light transmissible support having a light transmissible conductive film and a photosemiconductor thin film in this order provided thereon, in such a manner that at least said photosemiconductor thin film is immersed in a metallic plating solution;
   a step of imagewise exposing said electrodeposition substrate with applying a voltage or an electric current to said conductive film, to form a black matrix comprising a metallic plating film in a non-exposed part;
   a step of immersing at least said photosemiconductor thin film, on which said black matrix has been formed, of said electrodeposition substrate in an electrodeposition solution containing a colored electrodeposition material; and
   a step of imagewise exposing said electrodeposition substrate with applying a voltage or an electric current to said conductive film, to form a colored electrodeposition film in an exposed part.

16. A process for producing a color filter comprising:
   a step of irradiating a substrate comprising a light transmissible support having thereon a light transmissible conductive film and a photosemiconductor thin film with a photoelectromotive function in this order with light in an aqueous electrolytic solution containing at least an electrodeposition material containing a coloring material to generate a photoelectromotive force in an irradiated part of said photosemiconductor thin film, so as to form a colored electrodeposition film by electrochemically depositing said electrodeposition material; and a step of forming a black matrix by an electrodeposition method, wherein said step of forming said black matrix comprises:
   a step of applying a voltage to said substrate, on which an electrode part is selectively formed, in an aqueous electrolytic solution containing at least an electrodeposition material containing a black coloring material, to form a black electrodeposition film on said electrode part; and
   a step of applying a voltage to said substrate, on which said electrode part is selectively formed, in an aqueous electrolytic solution containing at least an electrodeposition material containing a metal, to form a metallic plating thin film in said electrode part.

17. A process for producing a color filter as claimed in claim 16, wherein after said step of forming said colored electrodeposition film, a bias voltage is applied to the whole surface of said substrate to form said electrode part in a part of said substrate, in which said colored electrodeposition film is not formed; said black electrodeposition film is formed in said electrode part; and said metallic plating thin film is formed in a part, in which said black electrodeposition film is formed.

18. A process for producing a filter comprising a filter forming step of arranging a light transmissible electrodeposition substrate comprising a light transmissible support having thereon a light transmissible conductive film and a photosemiconductor thin film with a photoelectromotive function in this order, in such a manner that said photosemiconductor thin film is immersed in an electrodeposition solution containing a colored electrodeposition material, and exposing a prescribed part of said electrodeposition substrate to form a colored electrodeposition film in a light irradiated part; and a black matrix forming step of forming a black matrix in a region, in which said filter is not formed, wherein said black matrix forming step comprises immersing at least a surface of said light transmissible electrodeposition substrate, on which said colored electrodeposition film is formed, in a metallic plating solution having coloring material particles dispersed therein; and applying a voltage or an electric current to said conductive film to form a metallic plating film containing said coloring material particles in a part of said photosemiconductor thin film, in which said colored electrodeposition film is not formed.

19. A process for producing a filter as claimed in claim 18, wherein an anodic electrode part, to which an electric current is supplied, is formed on said light transmissible electrodeposition substrate; said filter forming step is conducted in said electrode part; and a black matrix part comprising a metallic plating film having said coloring material particles dispersed therein is selectively formed in a part, in which said filter is not formed, by applying a bias voltage to the whole surface of said substrate.

20. A process for producing a filter as claimed in claim 18, wherein said photosemiconductor thin film having a photoelectromotive function is provided; said filter forming step is conducted by a photoelectrodeposition method; and a black matrix part comprising a metallic plaiting film having said coloring particles dispersed therein is selectively formed in a part, in which said filter is not formed, by a dispersion plating method of dispersing black colored particles with applying a bias voltage to the whole surface of said substrate.

* * * * *